US012647981B2

(12) United States Patent
Grieco

(10) Patent No.: US 12,647,981 B2
(45) Date of Patent: Jun. 2, 2026

(54) INTER-UE COORDINATION FOR SIDELINK ENHANCEMENTS

(71) Applicant: TOYOTA JIDOSHA KABUSHIKI KAISHA, Toyota (JP)

(72) Inventor: Donald M. Grieco, Manhasset, NY (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 442 days.

(21) Appl. No.: 18/245,016

(22) PCT Filed: Sep. 13, 2021

(86) PCT No.: PCT/JP2021/033529
§ 371 (c)(1),
(2) Date: Mar. 13, 2023

(87) PCT Pub. No.: WO2022/054942
PCT Pub. Date: Mar. 17, 2022

(65) Prior Publication Data
US 2023/0362934 A1 Nov. 9, 2023

Related U.S. Application Data

(60) Provisional application No. 63/077,747, filed on Sep. 14, 2020.

(51) Int. Cl.
*H04W 72/20* (2023.01)
*H04W 72/40* (2023.01)
*H04W 76/40* (2018.01)

(52) U.S. Cl.
CPC ........... *H04W 72/20* (2023.01); *H04W 72/40* (2023.01); *H04W 76/40* (2018.02)

(58) Field of Classification Search
CPC ....... H04W 92/18; H04W 76/14; H04W 4/40; H04W 4/46; H04W 4/44
See application file for complete search history.

(56) References Cited

U.S. PATENT DOCUMENTS

2018/0035477 A1 2/2018 Van Phan et al.
2020/0008266 A1* 1/2020 Pan ....................... H04L 1/1642
(Continued)

FOREIGN PATENT DOCUMENTS

| CN | 110945936 A | 3/2020 |
| WO | WO 2020/056680 A1 | 3/2020 |
| WO | WO 2020/064643 A1 | 4/2020 |

OTHER PUBLICATIONS

ITRI, "Discussion on NR Sidelink Resource Allocation for Mode 2," 3GPPTSG RAN WG1 #96bis R1-1905077, Apr. 1, 2019, pp. 1-8.
(Continued)

*Primary Examiner* — Khalid W Shaheed
(74) *Attorney, Agent, or Firm* — Finnegan, Henderson, Farabow, Garrett, and Dunner, LLP

(57) ABSTRACT

An apparatus for utilization in wireless communications comprises an antenna for use in transmission of electromagnetic signals, a memory for maintaining computer-readable code, and a processor for executing the computer-readable code. The processor causes the apparatus to transmit an indication including at least one of information that the first UE has been assigned a coordinating UE for coordination of sidelink transmissions of a plurality of additional UEs or information identifying an assigned coordinating UE, and transmit one or more groupcast transmission parameters for transmitting sidelink transmission parameters to the plurality of additional UEs.

8 Claims, 20 Drawing Sheets

(56)        References Cited

U.S. PATENT DOCUMENTS

| 2020/0092685 A1 | 3/2020 | Fehrenbach et al. |
| 2020/0106566 A1* | 4/2020 | Yeo ........................ H04L 1/1854 |
| 2020/0163005 A1* | 5/2020 | Rao ......................... H04W 4/44 |
| 2020/0245113 A1* | 7/2020 | Kang .................. H04W 40/246 |
| 2021/0014831 A1* | 1/2021 | Ryu ...................... H04W 72/02 |
| 2021/0051505 A1* | 2/2021 | Xu ........................ H04W 24/10 |
| 2021/0144791 A1* | 5/2021 | Kang ................... H04W 76/27 |
| 2022/0408226 A1 | 12/2022 | Fehrenbach et al. |

OTHER PUBLICATIONS

3rd Generation Partnership Project, "3GPP TS 38.214 V16.6.0", dated Jun. 2021 (including Section 8), pp. 1-172.
3rd Generation Partnership Project, "3GPP TS 38.321 V16.5.0", dated Jun. 2021 (including Section 5.8.3), pp. 1-157.

* cited by examiner

| Transport channel Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel Logical channel | UL-SCH | RACH |
|---|---|---|
| CCCH | X | |
| DCCH | X | |
| DTCH | X | |

FIG. 3B

| Transport channel Logical channel | SL-BCH | SL-SCH |
|---|---|---|
| SBCCH | X | |
| SCCH | | X |
| STCH | | X |

FIG. 3C

| Physical channel / Transport channel | PDSCH | PDCCH | PBCH |
|---|---|---|---|
| BCH | | | X |
| PCH | X | | |
| DL-SCH | X | | |

| Physical channel / Transport channel | PUSCH | PUCCH | PRACH |
|---|---|---|---|
| UL-SCH | X | | |
| RACH | | | X |

| Physical channel / Transport channel | PSSCH | PSCCH | PSFCH | PSBCH |
|---|---|---|---|---|
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

Without Inter-UE coordination

With Inter-UE coordination

INTER-UE COORDINATION FOR SIDELINK ENHANCEMENTS

CROSS-REFERENCE TO RELATED APPLICATIONS

This application is a national stage of International Application No. PCT/JP2021/033529, filed Sep. 13, 2021, and is based upon and claims the benefit of priority from U.S. Patent Application No. 63/077,747 filed Sep. 14, 2020, the entire contents of which are incorporated herein by reference.

This application claims the benefit of U.S. Provisional Application No. 63/077,747, entitled "INTER-UE COORDINATION FOR SIDELINK ENHANCEMENTS," and filed on Sep. 14, 2020. U.S. Provisional Application No. 63/077,747 is incorporated by reference herein.

TECHNICAL FIELD

The disclosure relates to a method for mobile communications.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method for mobile communications including sidelink transmissions is provided. The method includes: receiving, by a first user equipment (UE) from a base station, an indication that the first UE is a coordinating UE for coordination of sidelink transmissions of one or more second UEs; receiving, by the first UE from the base station, one or more groupcast transmission parameters; determining, by the first UE, sidelink transmission parameters for the one or more second UEs and for avoiding collision or half-duplex conflict among the sidelink transmissions of the one or more second UEs; and transmitting, by the first UE, to the one or more second UEs and based on the one or more groupcast transmission parameters, a groupcast message comprising the sidelink transmission parameters for the one or more second UEs.

In some embodiments of this disclosure, a method for mobile communications is provided. The method includes: receiving, by a first user equipment (UE) from a base station, an indication that the first UE is associated with one or more coordinating UEs; receiving, by the first UE from the base station, groupcast transmission parameters of a first coordinating UE of the one or more coordinating UEs; receiving, by the first UE, from the first coordinating UE, and based on the groupcast transmission parameters, a groupcast message including sidelink transmission parameters for avoiding a collision or a half-duplex conflict for sidelink transmissions of the first UE; and transmitting, by the first UE to a second UE, sidelink data based on the sidelink transmission parameters received from the first coordinating UE.

In some embodiments of this disclosure, a first UE for a mobile communication network is provided. The first UE includes a memory storing instructions; and a processor configured to execute the instructions to: receive, from a base station, an indication that the first UE is a coordinating UE for coordination of sidelink transmissions of one or more second UEs; receive, from the base station, one or more groupcast transmission parameters; determine sidelink transmission parameters for the one or more second UEs to avoid collision or half-duplex conflict among the sidelink transmissions of the one or more second UEs; and transmit, to the one or more second UEs, based on the one or more groupcast transmission parameters, a groupcast message comprising the sidelink transmission parameters for the one or more second UEs.

In some embodiments of this disclosure, a first UE for a mobile communication network is provided. The first UE includes a memory storing instructions; and a processor configured to execute the instructions to: receive, from a base station, an indication that the first UE is associated with one or more coordinating UEs; receive, from the base station, groupcast transmission parameters of a first coordinating UE of the one or more coordinating UEs; receive, from the first coordinating UE, based on the groupcast transmission parameters, a groupcast message including sidelink transmission parameters for avoiding a collision or a half-duplex conflict for sidelink transmissions of the first UE; and transmit, to a second UE, sidelink data based on the sidelink transmission parameters received from the first coordinating UE.

In some embodiments of this disclosure, a base station for a mobile communication system including sidelink transmissions of one or more second UEs is provided. The base station includes a memory storing instructions; and a processor configured to execute the instructions to: transmit, to a first UE, an indication that the first UE is a coordinating UE or is associated with at least one coordinating UE for coordination of sidelink transmissions of the one or more second UEs; and transmit, to the first UE, one or more groupcast transmission parameters, wherein the first UE is configured to transmit sidelink transmission parameters to the one or more second UEs based on the one or more groupcast transmission parameters.

In some embodiments of this disclosure, a system for mobile communication is provided. The system includes a base station configured to transmit, to a first UE, an indication that the first UE is a coordinating UE or is associated with one or more coordinating UEs for sidelink transmissions; one or more second UEs configured to perform the sidelink transmissions; and the first UE that is configured to transmit to the one or more second UEs, sidelink transmission parameters for the one or more second UEs.

In some embodiments of this disclosure, a non-transitory computer readable medium is provided. The non-transitory computer readable medium stores a set of instructions that is executable by at least one processor of a first user equipment (UE) in a mobile communication system including sidelink transmissions of one or more second UEs to cause the first UE to perform a method. The method includes: receiving, by the first UE from a base station, an indication that the first UE is a coordinating UE for coordination of sidelink transmissions of the one or more second UEs; receiving, by the first UE from the base station, one or more groupcast transmission parameters; determining, by the first UE, sidelink transmission parameters for the one or more second UEs to avoid collision or half-duplex conflict among the sidelink transmissions of the one or more second UEs; and transmitting, by the first UE to the one or more second UEs, and based on the one or more groupcast transmission parameters, a groupcast message comprising the sidelink transmission parameters for the one or more second UEs.

In some embodiments of this disclosure, a non-transitory computer readable medium is provided. The non-transitory computer readable medium stores a set of instructions that is executable by at least one processor of a first user equipment (UE) in a mobile communication system including sidelink transmissions of one or more second UEs to cause the first UE to perform a method. The method includes receiving, by the first UE from a base station, an indication that the first UE is associated with one or more coordinating UEs; receiving, by the first UE from the base station, groupcast transmission parameters of a first coordinating UE of the one or more coordinating UEs; receiving, by the first UE from the first coordinating UE, and based on the groupcast transmission parameters, a groupcast message including sidelink transmission parameters for avoiding a collision or a half-duplex conflict for sidelink transmissions of the first UE; and transmitting, by the first UE to the one or more second UEs, sidelink data based on the sidelink transmission parameters received from the first coordinating UE.

In some embodiments of this disclosure, a non-transitory computer readable medium is provided. The non-transitory computer readable medium stores a set of instructions that is executable by at least one processor of a base station in a mobile communication system including sidelink transmissions of one or more second UEs to cause the base station to perform a method. The method includes transmitting, to a first UE, an indication that the first UE is a coordinating UE or is associated with at least one coordinating UE for coordination of the sidelink transmissions of the one or more second UEs; and transmitting, to the first UE, one or more groupcast transmission parameters, wherein the first UE is configured to transmit sidelink transmission parameters to the one or more second UEs based on the one or more groupcast transmission parameters.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

DESCRIPTION OF EMBODIMENTS

The following disclosure provides many different embodiments, or examples, for implementing different features of the provided subject matter. Specific examples of arrangements are described below to simplify the present disclosure. These are merely examples and are not intended to be limiting.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
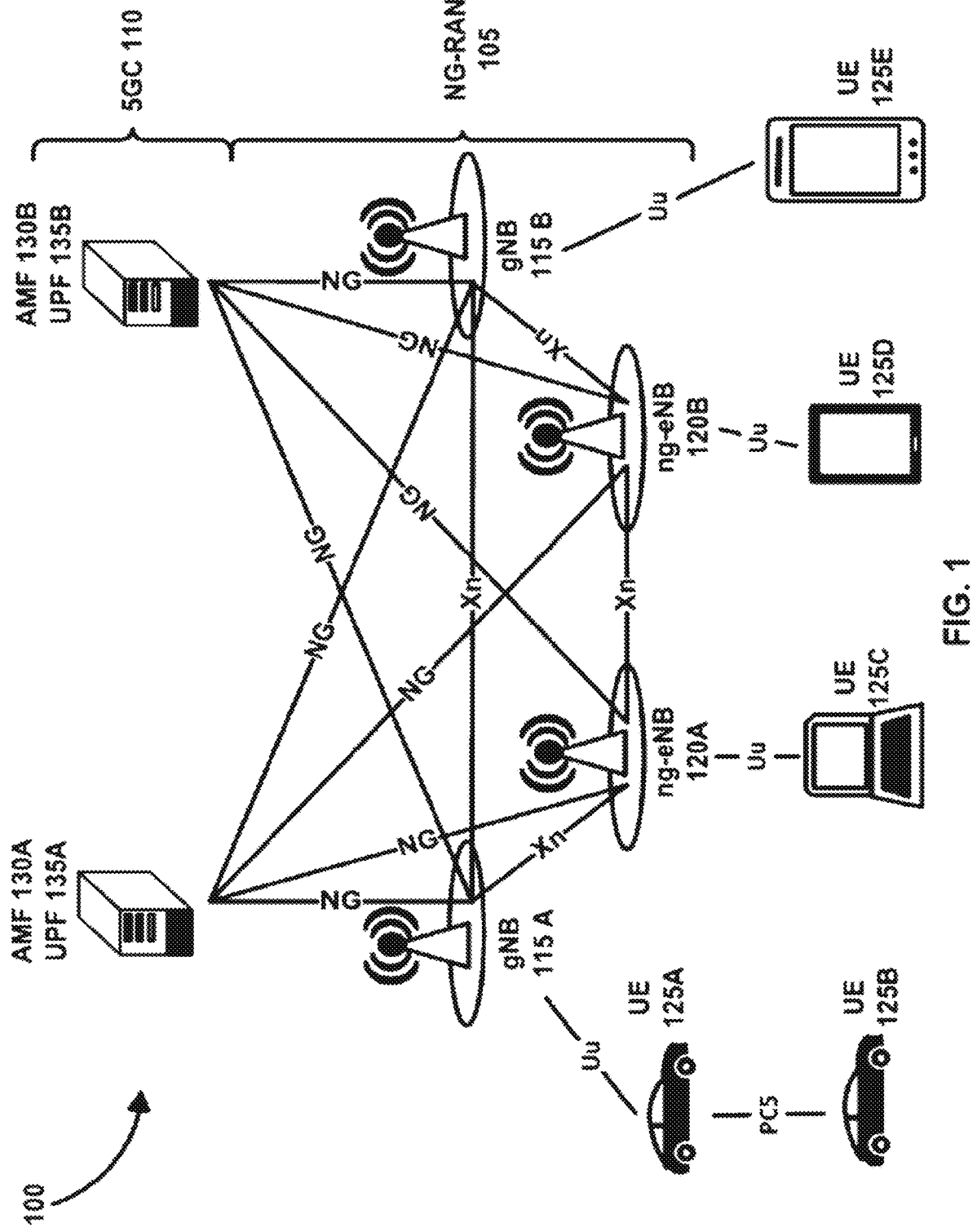
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the RAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN as described herein. Such other devices may have other functionality or multiple functionalities in addition to wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that used the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF 135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
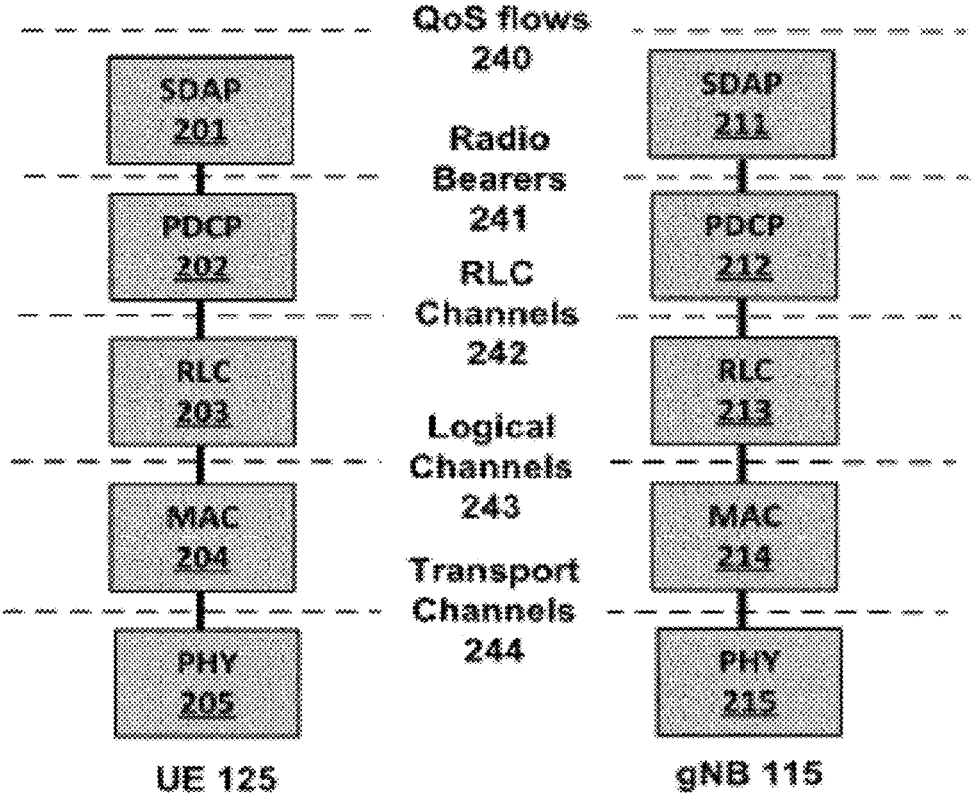
FIG. 2A and FIG. 2B show examples of radio protocol stacks for user plane and control plane, respectively, according to some aspects of one or more exemplary embodiments of the present disclosure.
Figure 2B:
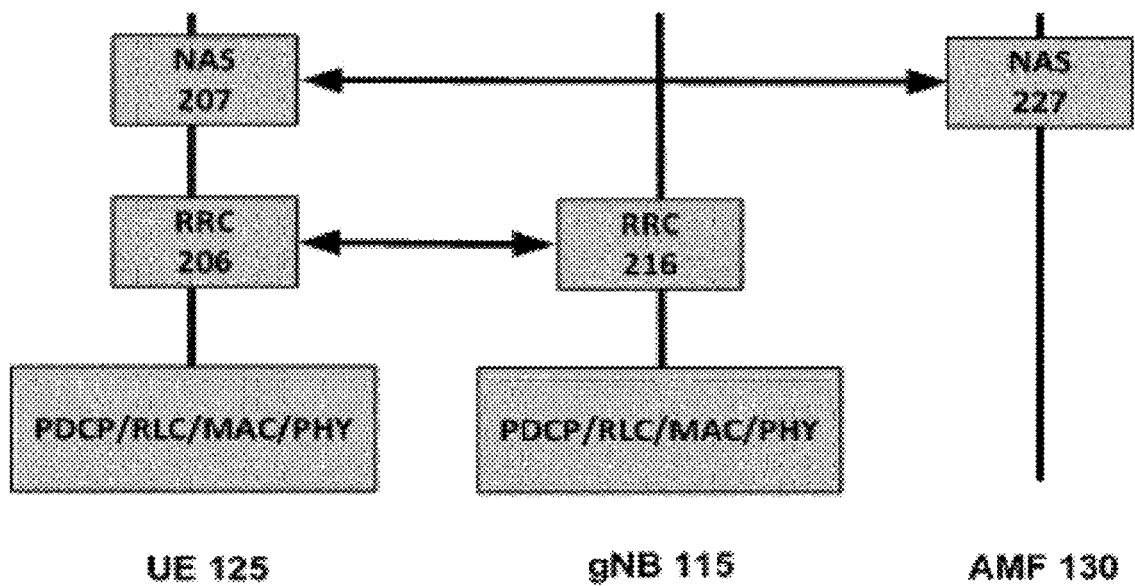

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and resegmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
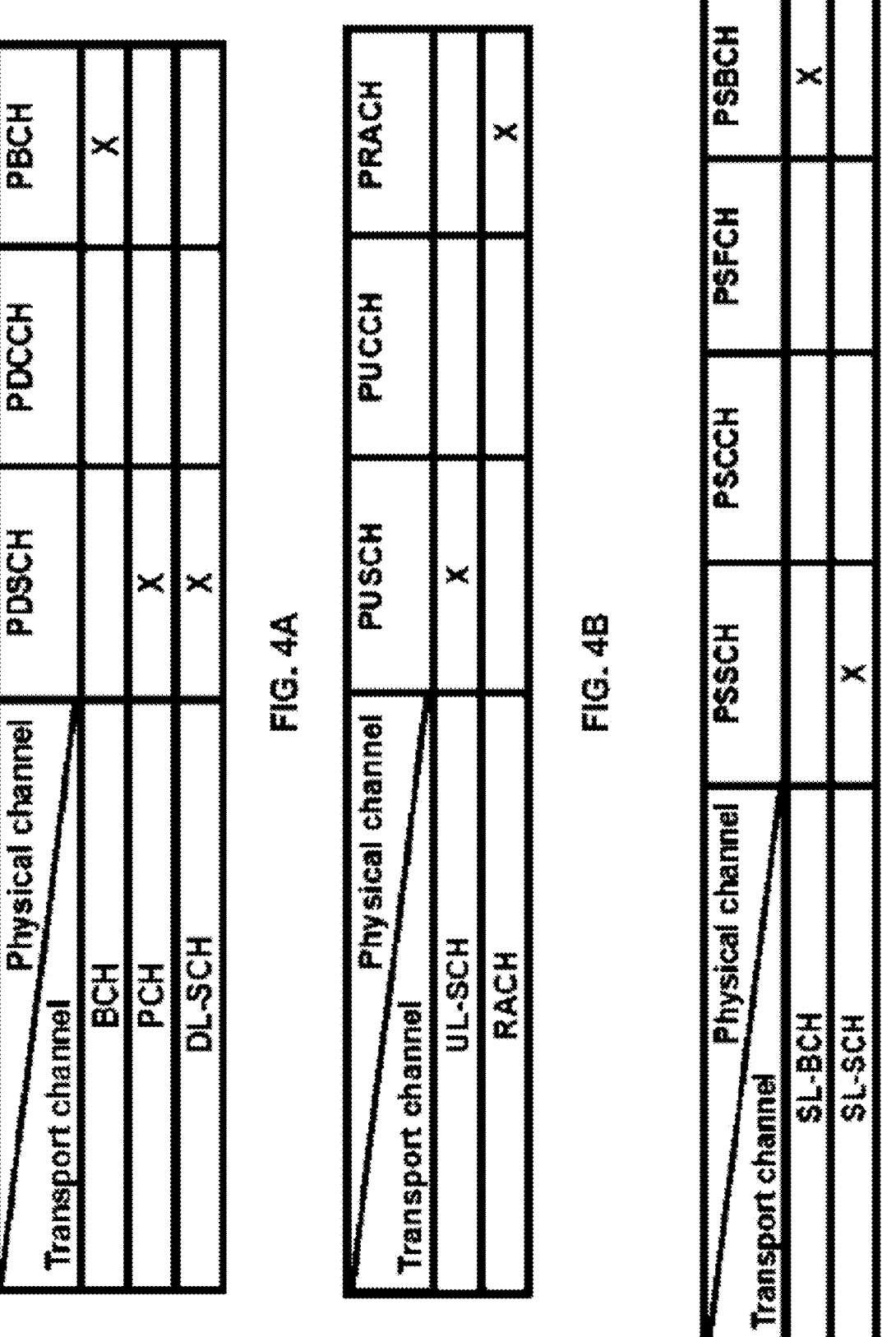
FIG. 4A, FIG. 4B and FIG. 4C show example mappings between transport channels and physical channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
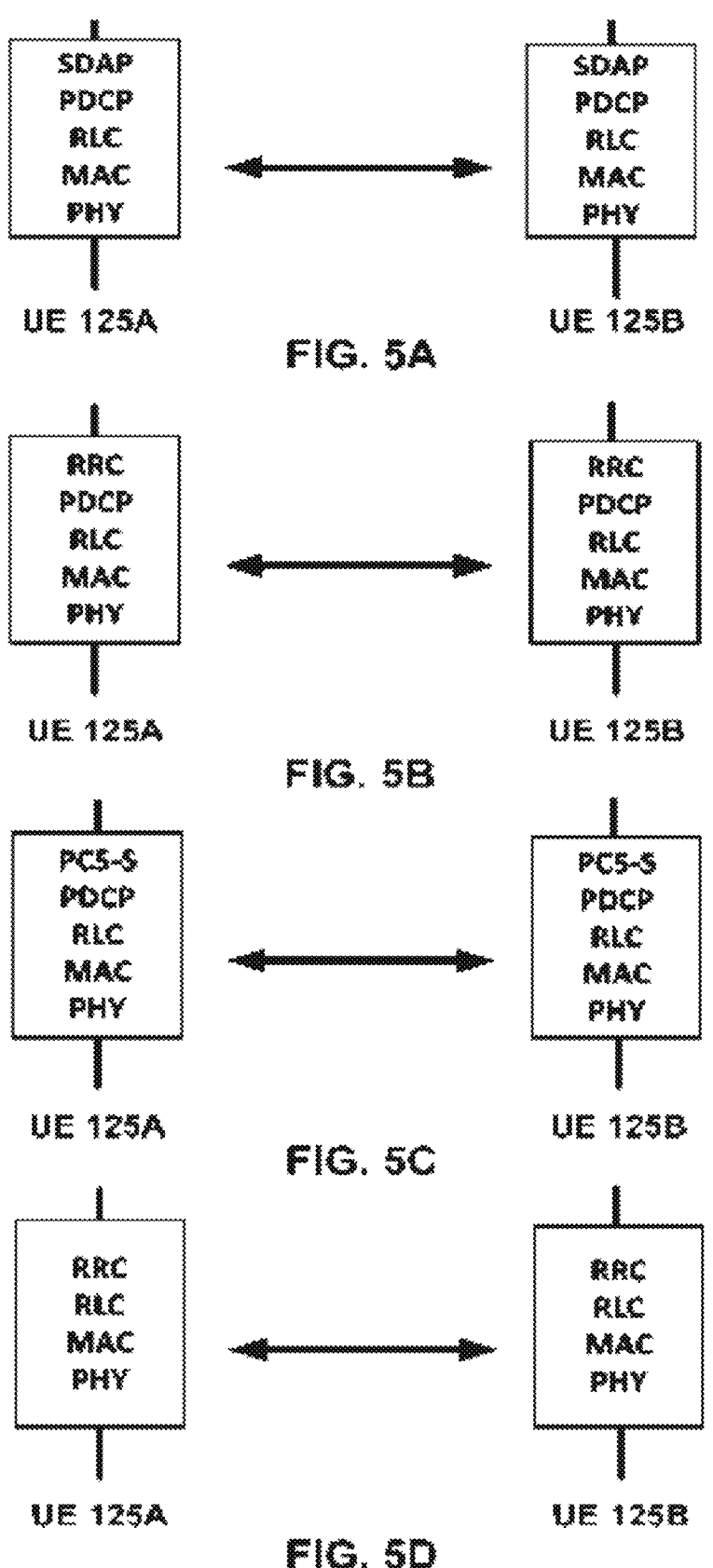
FIG. 5A, FIG. 5B, FIG. 5C and FIG. 5D show examples of radio protocol stacks for NR sidelink communication according to some aspects of one or more exemplary embodiments of the present disclosure.

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
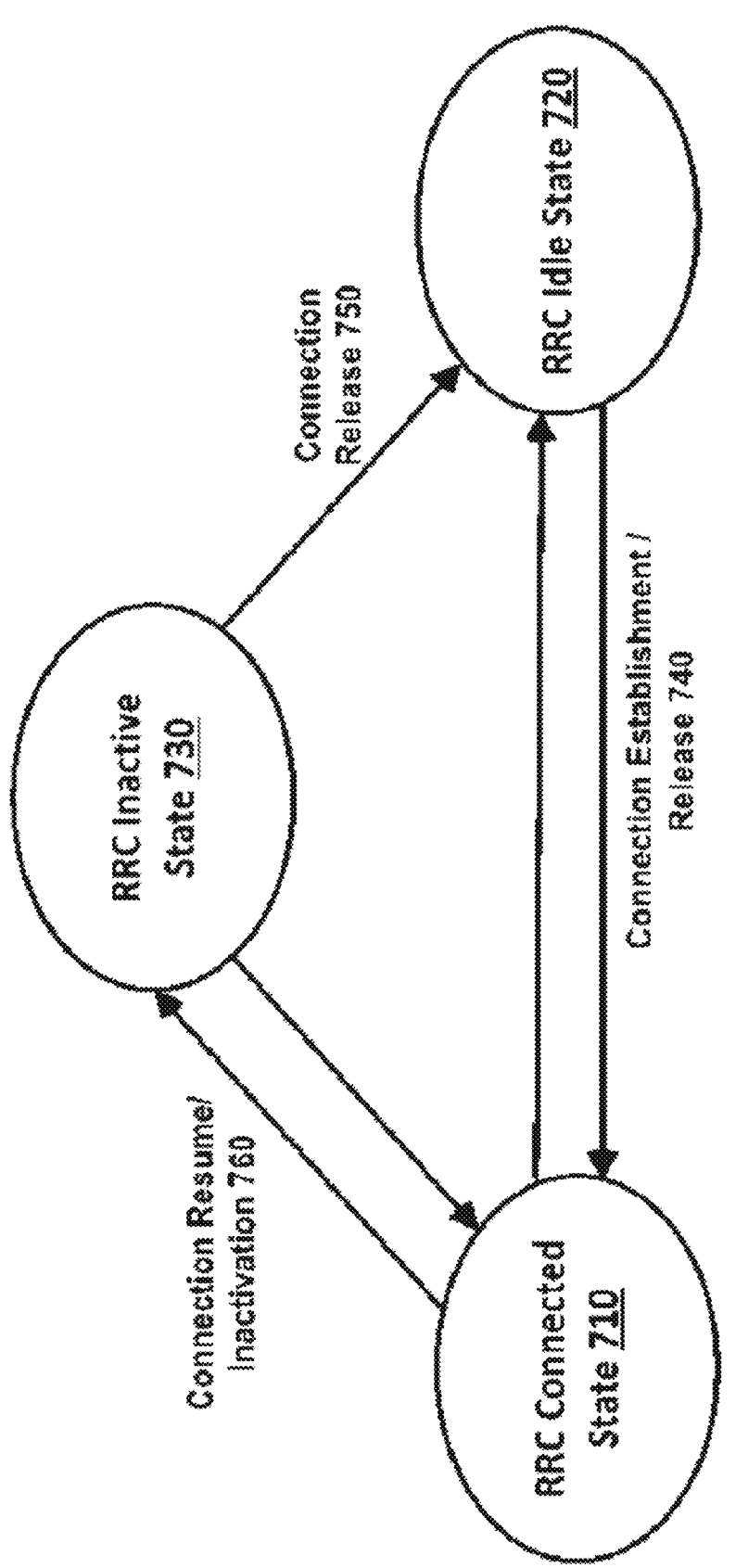
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
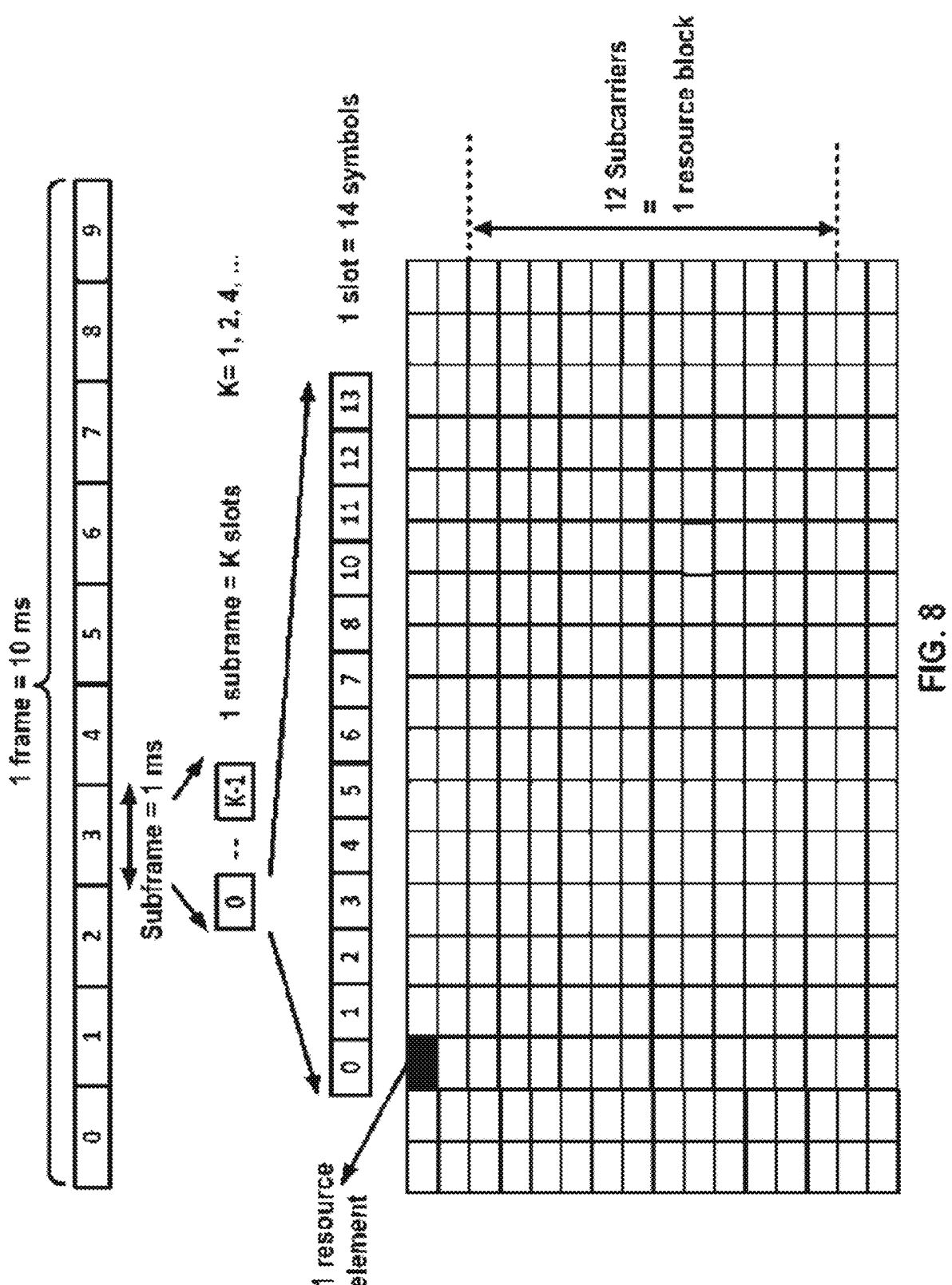
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
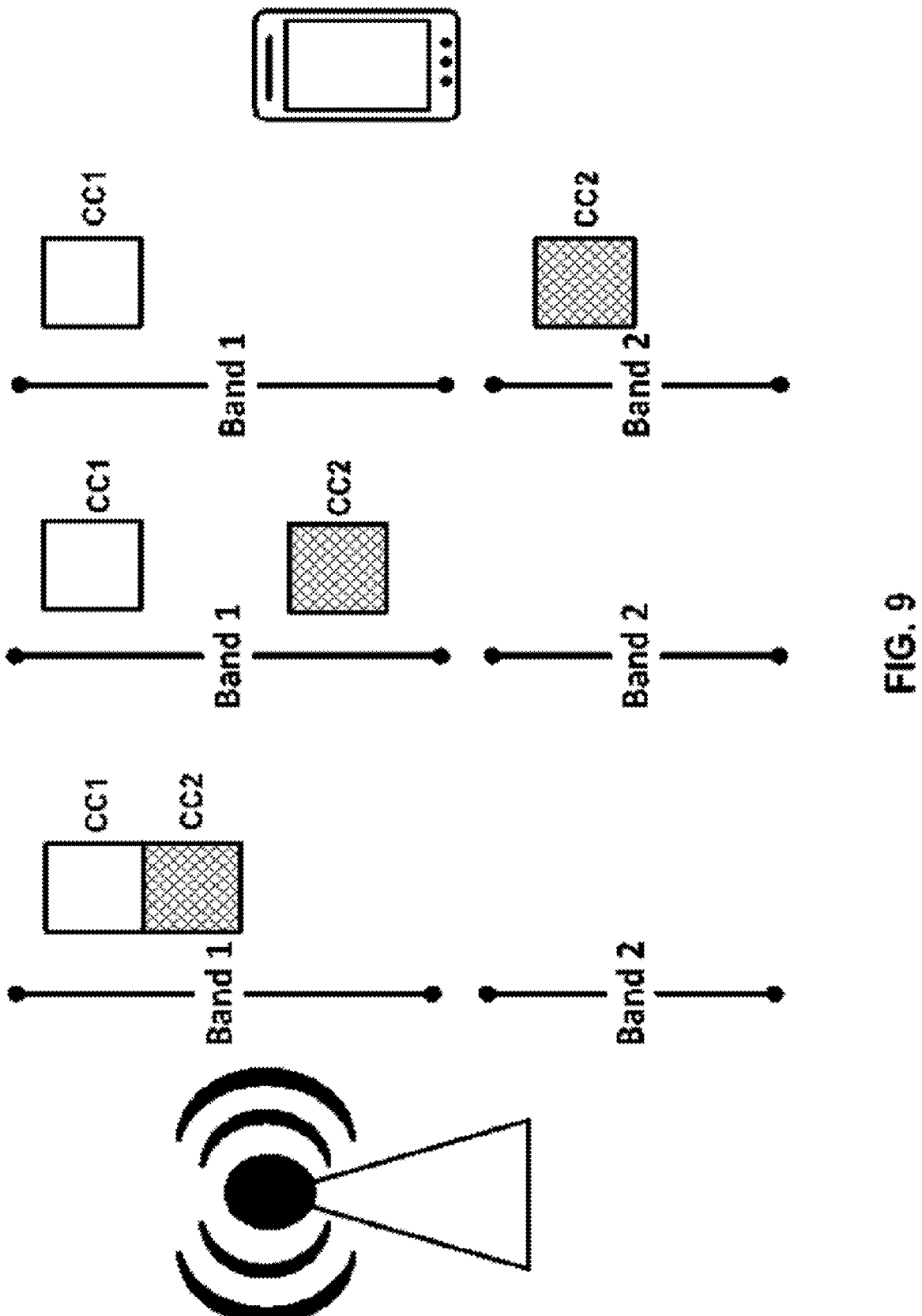
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
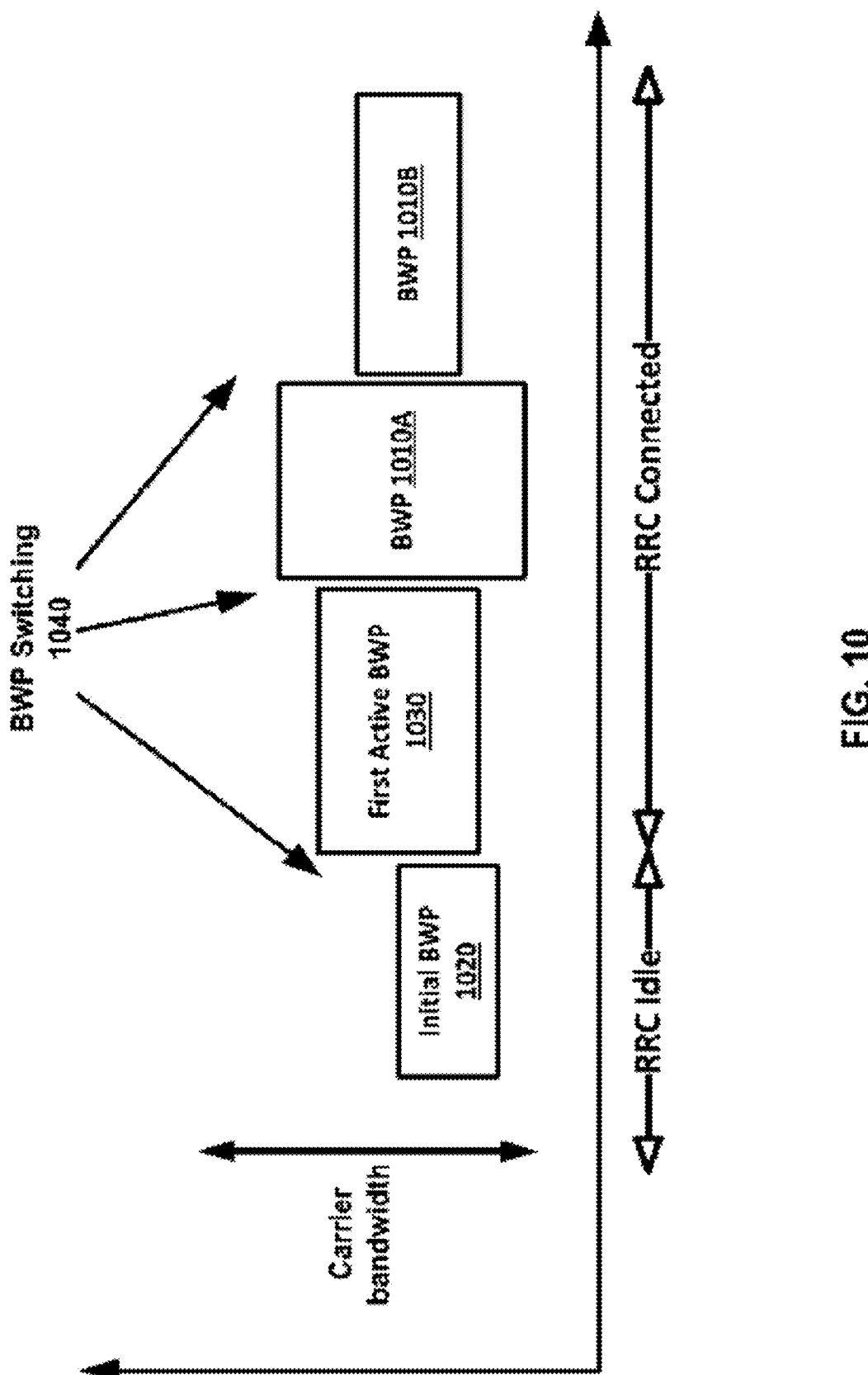
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
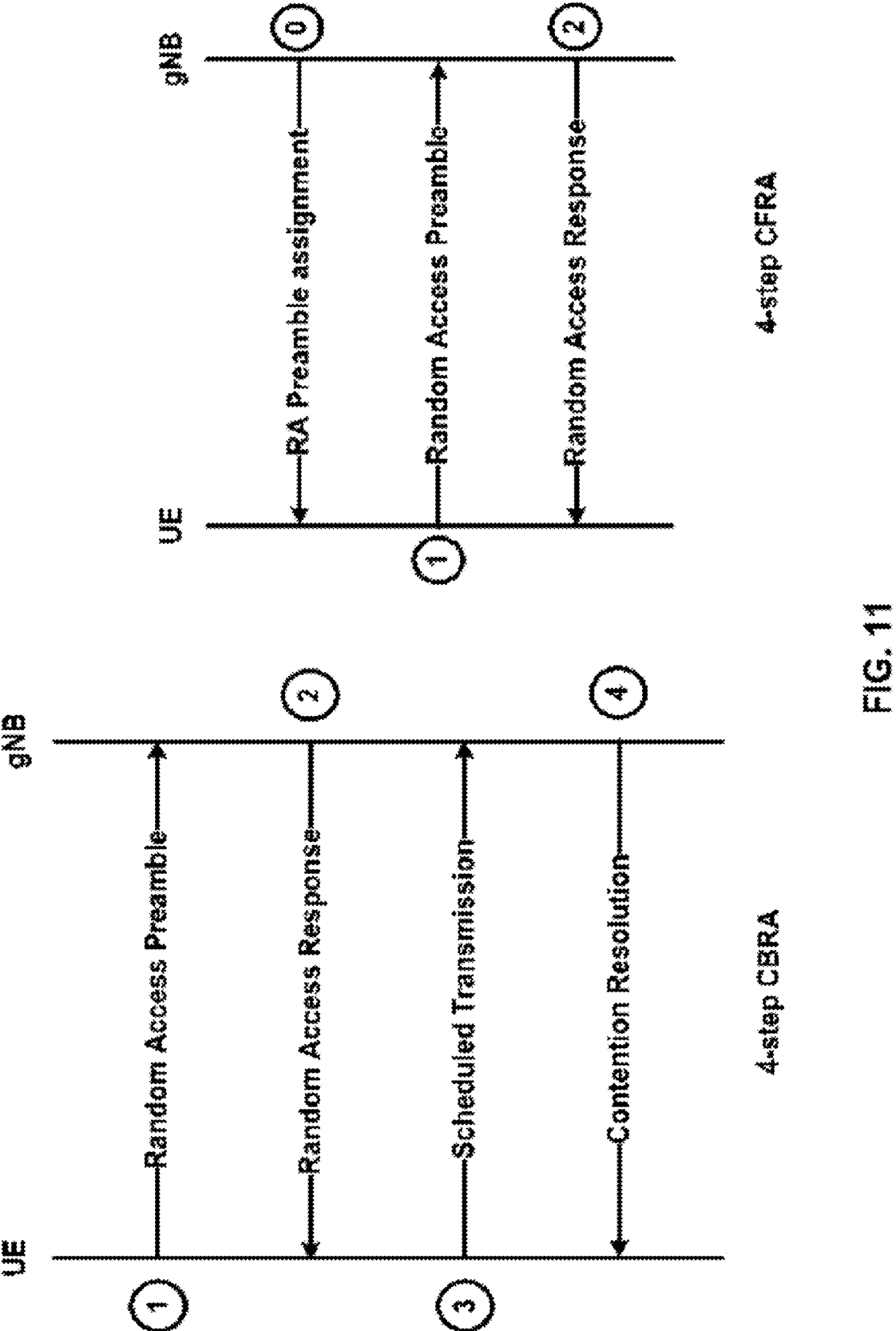
FIG. 11 shows example four-step contention-based and contention-free random access processes according to some aspects of one or more exemplary embodiments of the present disclosure.
Figure 12:
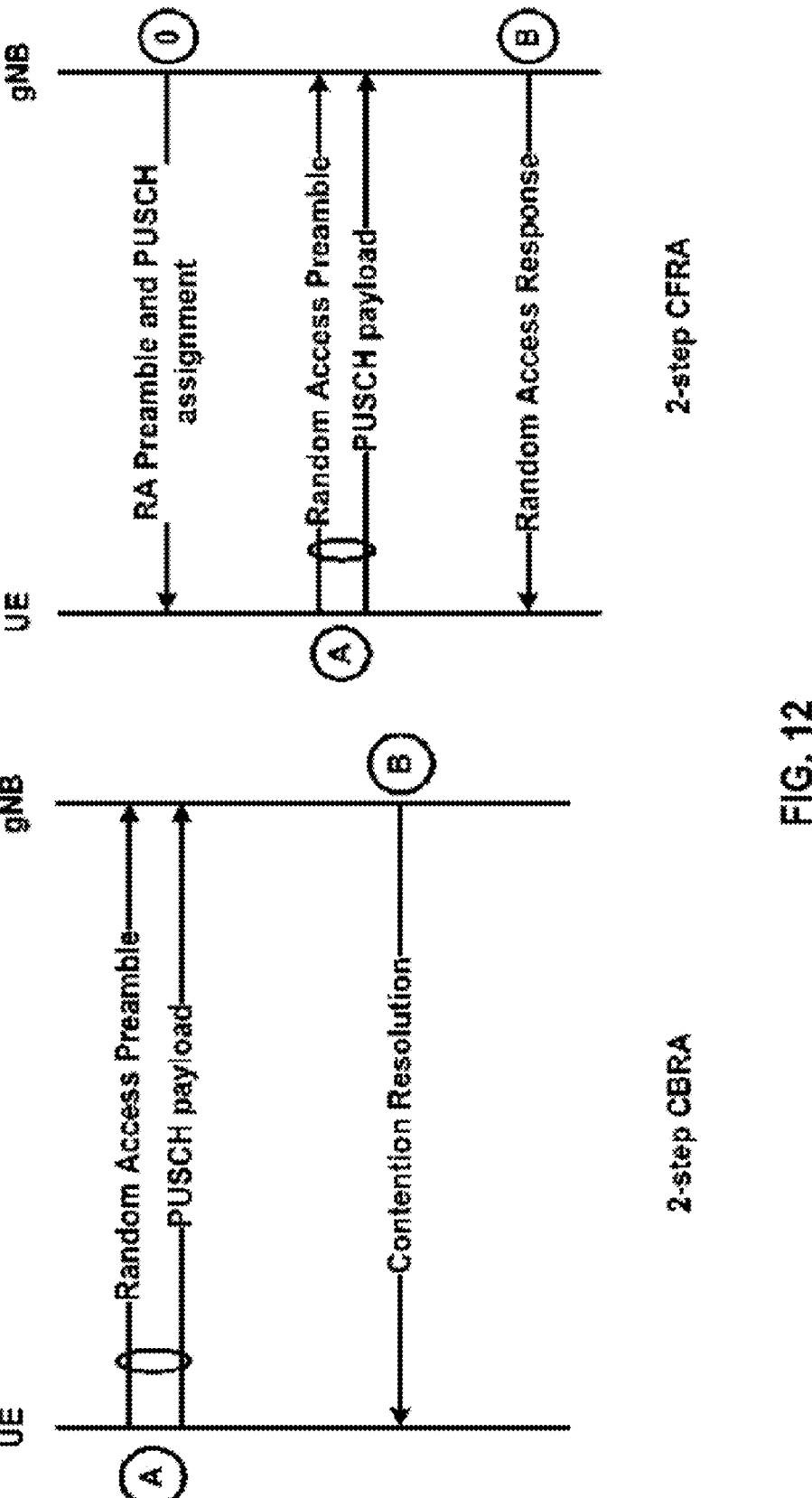
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11 (Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
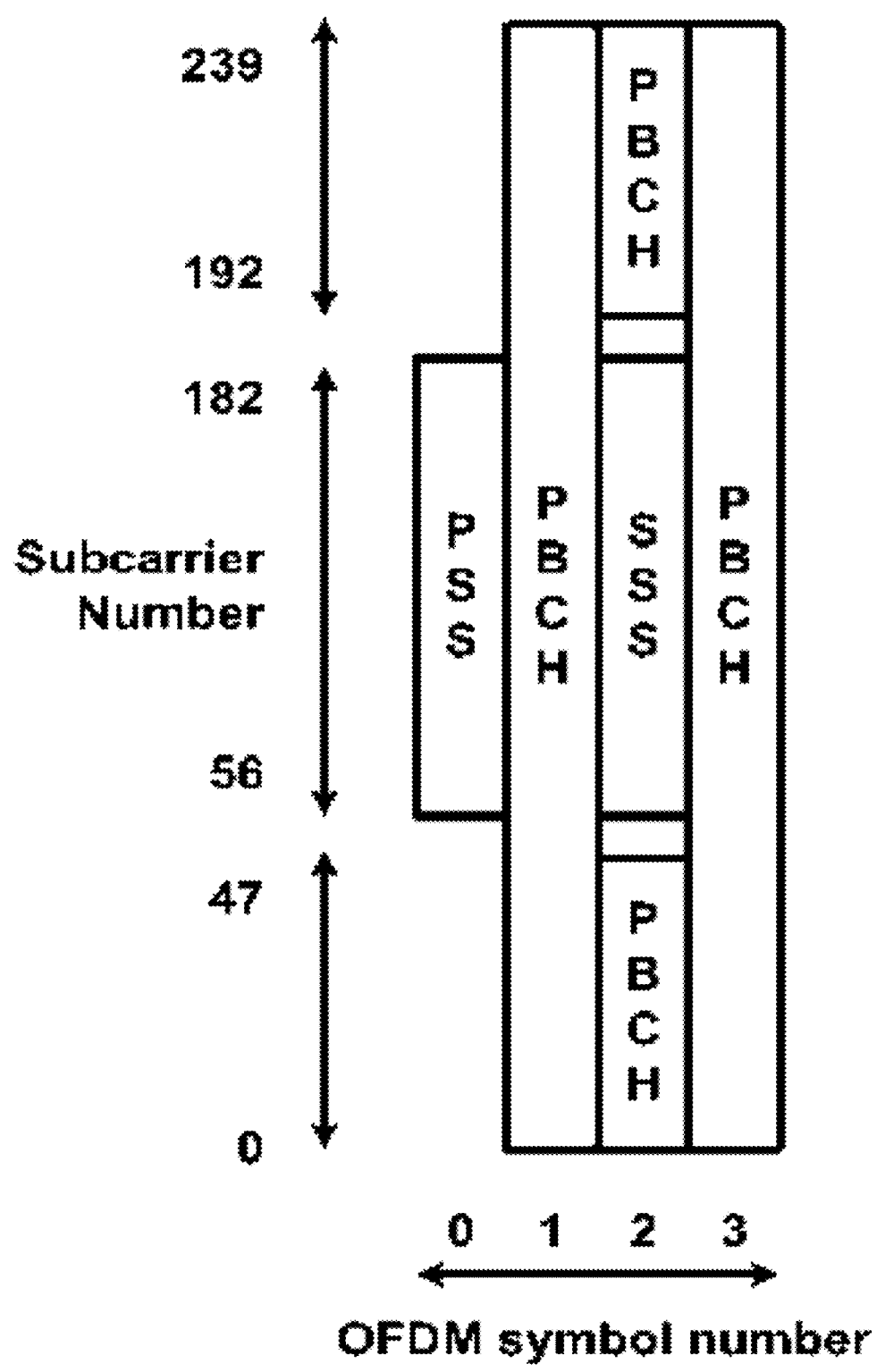
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
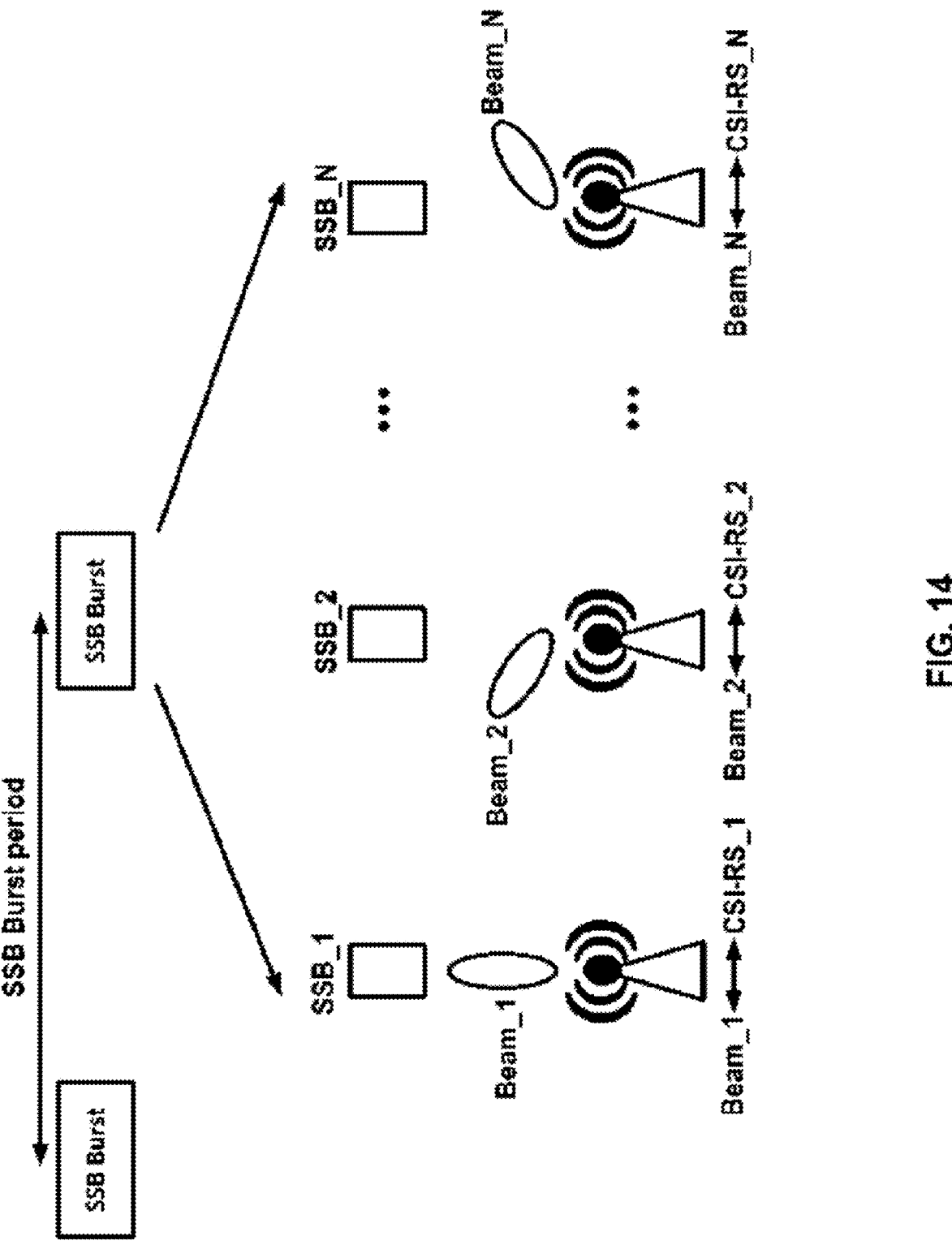
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
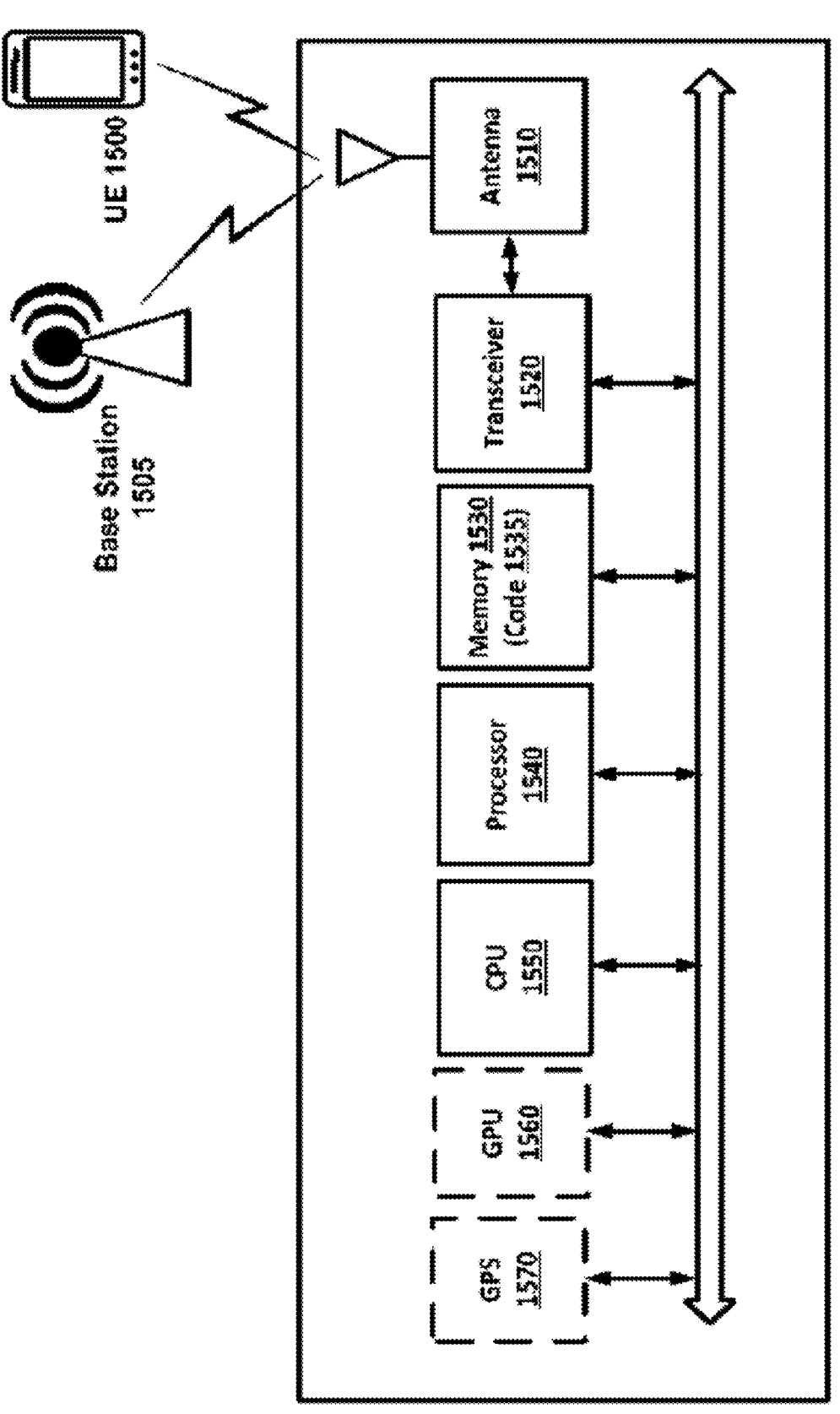
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some embodiments, depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some examples, the UE 1500 may be configured to or programmed to function as a coordinating UE in a mobile communication system including sidelink transmissions. In addition to the UE 1500 and the base station 1505, the mobile communication system may also include one or more second UEs. The UE 1500 may be configured to or programmed to receive an indication that the UE 1500 is a coordinating UE for coordination of sidelink transmissions of one or more second UEs. The UE 1500 may receive the indication from the base station 1505. The UE 1500 may receive the indication through an antenna, such as antenna 1510. The UE 1500 may be further configured to or programmed to receive one or more groupcast transmission parameters from the base station 1505. The UE 1500 may be configured to programmed to determine sidelink transmission parameters for the one or more second UEs to avoid collision or half-duplex conflict among the sidelink transmissions of the one or more second UEs. The sidelink transmission parameters may include a set of resources preferred for the one or more second UEs or a set of resources not preferred for the one or more second UEs. In some embodiments, the sidelink transmission parameters may include a set of resources preferred for the one or more second UEs. In these embodiments, the UE 1500 may sense transmission parameters of the one or more second UEs and determine the sidelink transmission parameters for the one or more second UEs based on a result of the sensing. In some embodiments, the sidelink transmission parameters may include a set of resources not preferred for the one or more second UEs. In these embodiments, the UE 1500 may determine the sidelink transmission parameters for the one or more second UEs based on at least one of: a result of sensing transmission parameters of the one or more second UEs, or a predicted information of a resource collision or a half-duplex conflict in the sidelink transmissions. The UE 1500 may be configured to or programmed to transmit to the one or more second UEs a groupcast message including the sidelink transmission parameters for the one or more second UEs. The UE 1500 may be configured to or programmed to transmit the groupcast message to the one or more second UEs based on the determined one or more groupcast transmission parameters. The UE 1500 may be configured to or programmed to transmit the groupcast message to the one or more second UEs at a predetermined time. In some embodiments, the one or more groupcast transmission parameters indicate one or more of transmission occasions and radio resources of groupcast messages. In some embodiments, the UE 1500 may transmit the set of resources determined for the one or more second UEs via a unicast message or a broadcast message. In the above examples, the memory of the UE 1500 (e.g., memory 1530) may store computer program codes (e.g., code 1535) that are executable by a processor (e.g., CPU 1550) to perform the functions of the UE 1500.

In some examples, the UE 1500 may be associated with one or more coordinating UEs in a mobile communication system. In these examples, the UE 1500 may be configured to or programmed to receive an indication that the UE 1500 is associated with the one or more coordinating UEs. The UE 1500 may receive the indication from the base station 1505. The UE 1500 may receive the indication through antenna 1510 and a receiver included in the transceiver 1520. The UE 1500 may be further configured to or programmed to receive from the base station 1505 groupcast transmission parameters of a first coordinating UE of the one or more coordinating UEs. The UE 1500 may be configured to or programmed to receive from the first coordinating UE a groupcast message including sidelink transmission parameters for avoiding a collision or a half-duplex conflict for sidelink transmissions of the UE 1500. The UE 1500 may be configured to or programmed to receive the groupcast message from the first coordinating UE based on the groupcast transmission parameters. The UE 1500 may be configured to or programmed to transmit to a second UE, sidelink data based on the sidelink transmission parameters received from the first coordinating UE. In these examples, the memory of the UE 1500 (e.g., memory 1530) may store computer program codes (e.g., code 1535) that are executable by a processor (e.g., CPU 1550) to perform the functions of the UE 1500.

In some examples, the base station 1505 is for a mobile communication system including sidelink transmissions of one or more second UEs. The base station 1505 may include a memory (e.g., memory 1530) storing instructions (e.g., code 1535) and a processor (e.g., CPU 1550) configured to or programmed to execute the instructions to transmit, to a first UE (e.g., UE 1500), an indication that the first UE is a coordinating UE or is associated with at least one coordinating UE for coordination of sidelink transmissions of the one or more second UEs. The base station may further transmit, to the first UE, one or more groupcast transmission parameters. In these examples, the first UE may be configured to or programmed to transmit sidelink transmission parameters to the one or more second UEs based on the one or more groupcast transmission parameters.

In some examples, a DCI format 3_0 may be used for scheduling of NR PSCCH and NR PSSCH in one cell. The following information may be transmitted by means of the DCI format 3_0 with CRC scrambled by SL-RNTI or SL-CS-RNTI: Resource pool index; Time gap; HARQ process number; New data indicator; Lowest index of the subchannel allocation to the initial transmission; SCI format fields including a frequency resource assignment and a time resource assignment, PSFCH-to-HARQ feedback timing indicator; Configuration index; and Counter sidelink assignment index.

In some examples, a SidelinkUEinformationNR message may be used for the indication of NR sidelink UE information to the network.

In some examples, a sl-QoS-FlowIdentity information element may provide an identity that uniquely identifies one sidelink QoS flow between the UE and the network in the scope of UE, which may be unique for different destination and cast type. In some examples, a sl-UE-AssistanceInformationNR information element may indicate the traffic characteristic of sidelink logical channel(s) that may be setup for NR sidelink communication. In some examples, system information block 12 (SIB12) may be used for NR sidelink communication configuration.

Figure 16B:
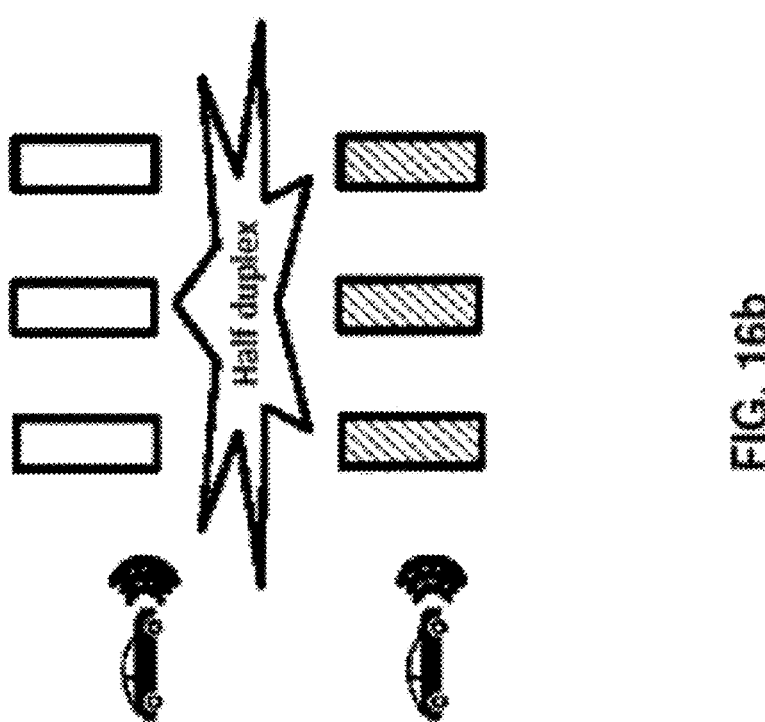
FIG. 16a and FIG. 16b show example collision and half-duplex conflict scenarios between UEs and without inter-UE coordination.
Figure 16A:
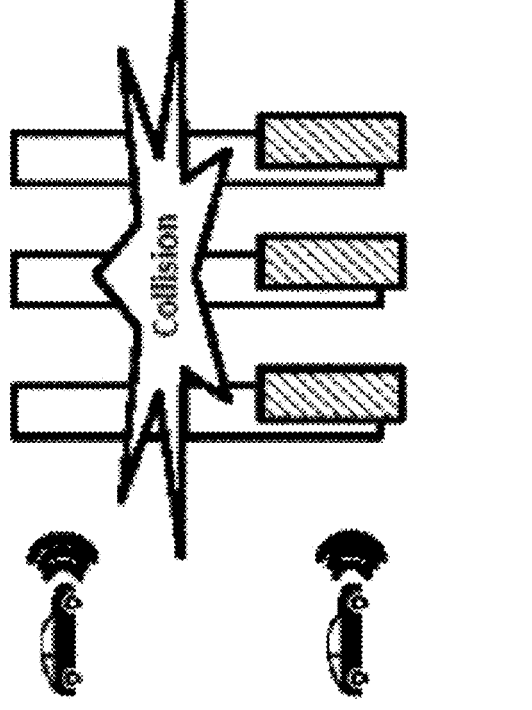

In mode 2 sidelink operations, a UE may autonomously select resources for transmission. Based on sensing results, the UE may avoid resource collisions with other UEs within its reception range. In some examples as shown in FIG. 16*a*, resource collisions may occur due to hidden nodes when two transmitting UEs are outside each other's transmission range and the same resources are used for transmitting to nearby receiving UEs, causing high interference. This problem may result in a transmitting UE not considering the other UE's reserved resources and not excluding these resources from its candidate resource set. In some cases, both the transmitting UEs may select the same resources for their respective transmissions to a common receiver UE. For the examples shown in FIG. 16*a*, UE 1 may always collide with UE 2.

Another example is a half-duplex operation in sidelink mode 2. As shown in FIG. 16*b*, due to the half-duplex nature of V2X UEs, when a UE (e.g., the UE 1) periodically transmits a packet on a given time slot, it may not be capable of receiving transmissions from other UEs. The UE may not be able to determine whether another UE (e.g., the UE 2) has transmitted a sidelink control information (SCI) on the time slot. The UE may miss out on sensing results for these time slots when it transmits. In scenarios where a UE has many data packets to transmit, it may end up missing out on sensing results on multiple time slots, resulting in an incomplete sensing result and increasing the probability of collision.

Example embodiments enhance reliability and reduce latency in the sidelink operation (e.g., sidelink mode 2 operation) based on the inter-UE coordination. In some examples, coordination may be introduced among UEs, wherein the inter-UE coordination may be based on assistance information exchange among UEs or by UEs to a coordinating UE that coordinates sidelink transmissions by one or more UEs associated with the coordinating UE. The assistance information may indicate a set of resources used by a UE. For example, a first UE may report its set of resources to second UE, and the second UE may consider the set of resources of the first UE when performing resource selection for its own transmission. The second UE may consider not to use the set of resources to be used by the first UE to avoid resource collision. That is, the set of resources may not be a set of resources preferred by the second UE.

The inter-UE coordination may be used in unicast, groupcast, and broadcast communications. The inter-UE coordination may be performed either prior to or after an initial transmission. In some examples, to avoid resource collision and/or half-duplex conflict prior to initial packet transmission, a coordinating UE may coordinate the resources for sidelink transmissions between the transmitting UEs. In some examples, one or more UEs that detect resource collision and/or half-duplex conflict after the initial transmission, may use assistance information to avoid the resource collision and/or half-duplex conflict in retransmission and/or the next new transmissions. That is, the coordinating UE may transmit the assistance information indicating a set of resources when a resource collision and/or a half-duplex conflict is detected.

In some examples, a Coordinating UE (also referred to as C-UE) may determine and/or indicate the set of resources to transmitting UE(s) and/or forward assistance information to other UEs. A Group UE (also referred to as G-UE) may receive the assistance information from the C-UE. The G-UE may use the information received from a C-UE and its own sensing results to select transmission resources for sending messages to one or more other UEs.

Figure 17:
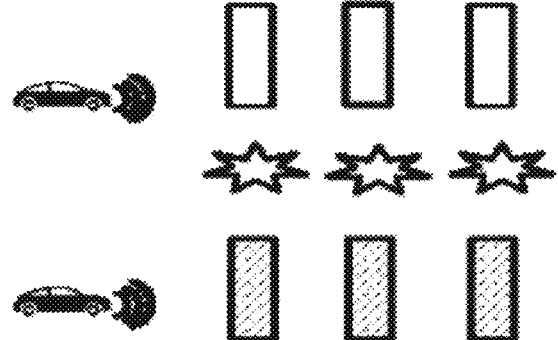
FIG. 17 shows example assistance information transmission by a coordinating user equipment (UE) to transmitting UEs according to some aspects of one or more exemplary embodiments of the present disclosure.
Figure 17:
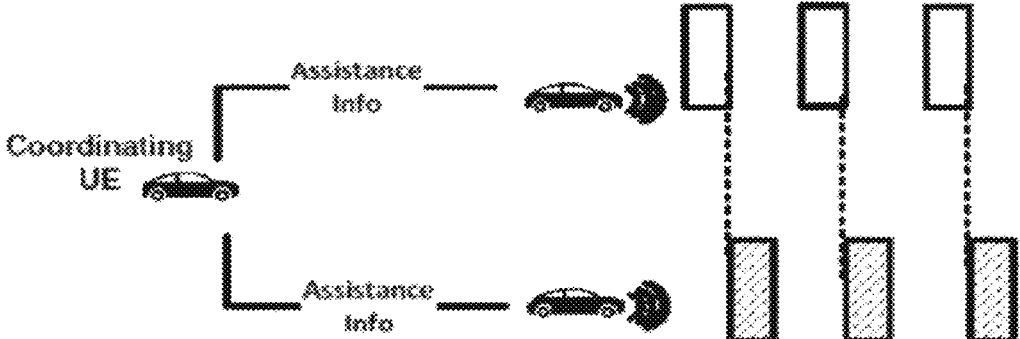

In some examples, a Coordinating UE may also be the receiving UE. In some examples as shown in FIG. 17, the coordinating UE may be a different UE that transmits assistance information to a transmitting UE and a receiving UE. Based on the assistance from the coordinating UE, the collision or the half-duplex conflict may be avoided.

In some examples, for inter UE coordination, a coordinating UE may indicate to the transmitting UE(s), the assistance information relevant to a (pre)-configured resource pool. A resource pool may be shared with different cast services. To realize a universal UE coordination within the resource pool, a unified mechanism for indicating the assistance information from a Coordinating UE to transmitting UEs may be used, without the limitation to cast types.

The assistance information may be provided by a Coordinating UE to a Transmitting UE in an active or passive manner. In some examples, a Coordinating UE may be aware of the information, such as available resources, interference, half-duplex and congestion status, and may actively indicate the assistance information to associated Transmitting UEs. In some examples, a transmitting UE may send the request to the Coordinating UE. The Coordinating UE may indicate the assistance information to the transmitting UE.

In some examples, a Coordinating UE may determine available resources which may be acquired based on either (pre)-configuration or sensing, and/or the Coordinating UE may measure the interference or predict/detect the information of resource collision that need to be avoided in a resource pool operation. The Coordinating UE may indicate this assistance information to the relevant UEs. For example, the Coordinating UE may transmit assistance information indicating a set of resources not preferred by the relevant UEs based on its sensing and/or predicted information of resource collision. A transmitting UE may take such assistance information into account and make the proper selection for next potential transmission occasion accordingly. For another example, the Coordinating UE may transmit assistance information indicating a set of resources to the relevant UEs based on the detected information of resource collision.

In some examples, a Transmitting UE that has a packet to transmit, may send a request to a Coordinating UE to acquire the assistance information. The request may contain the QoS requirement, cast type, and geographical information, and communication range associated with the packet. The Coordinating UE may indicate the assistance information to the Transmitting UE based on the request. The assistance information may indicate a set of resources can be used by the Transmitting UE. That is, the set of resources are preferred resources for the Transmitting UE's transmission.

In some examples, the assistance information message provided by the Coordinating UE to the Transmitting UE may contain one or more of a destination ID, a Source ID, a set of resources for transmission and coordination information.

In some examples, a UE as a coordinating UE may be either (pre)-authorized or self-authorized, depending on the deployment scenario. Due to the mobility, multiple Coordinating UEs may be necessary to be involved in the coordination among UEs. In some examples, the Coordinating UEs may establish a unicast link to exchange the assistance information, to avoid the conflict of assistance information issued by multiple Coordinating UEs.

In some example embodiments, the network (NW)/gNB may identify Coordinating UEs, denoted as C-UEs, for example, by their geographical locations. For example, the NW/gNB may determine overlapping cells containing multiple UEs wherein each cell may comprise one or more G-UEs and a UE of the one or more G-UEs may be determined as a C-UE. The NW/gNB may set up/determine groups of UEs, denoted as G-UEs, each associated with a C-UE. The NW/gNB may indicate (e.g., in an RRC configuration message or using dynamic signaling) to a UE that the UE is a C-UE. The NW/gNB may provide the C-UE's groupcast parameters, including periodicity, to the C-UE. The NW/gNB may indicate the C-UE's groupcast parameters using a DCI (e.g., DCI format 3_0). A G-UE may be assigned to one or more coordination groups by the NW/gNB. The NW/gNB may indicate a C-UE associated with a group of UEs (e.g., G-UEs) to the G-UEs. For example, the identity of the C-UE in a group may be provided by the NW/gNB to the G-UE using the DL information transfer message. In some examples, the NW/gNB may send the C-UEs' groupcast parameters and periodicities to the G-UEs. The C-UE may detect and collect the transmission parameters of one or more UEs associated with the C-UE. The C-UE may combine the detected transmission parameters into a groupcast message. The C-UE may transmit the groupcast message at pre-established and/or periodic instances. The G-UE may receive and decode the groupcast message from the C-UE. In some examples, if the message was received with a CRC failure, the G-UE may use the parameters contained in the last correctly received message. If CRC failure occurs in a preassigned number of consecutive messages from the C-UE, the G-UE may send a "lost C-UE" message (e.g., using a FailureInformation message) to the NW/gNB. The "lost C-UE" message is an example of a failure message indicating that the coordinating UE is lost. Using the received transmission parameters and its own additional channel sensing, the G-UE may transmit to a destination UE in time-frequency resources where a collision or half-duplex conflict may not occur.

In some examples, the NW/gNB may send the C-UEs' groupcast parameters to the G-UE using DCI format 3_0. In some examples, a separate message may be sent for each C-UE assigned to each G-UE. In some example, C-UEs' groupcast parameters may be broadcast with a system information block (SIB, e.g., SIB12).

In some examples, the C-UE may combine the detected transmission parameters into a groupcast message by the C-UE on a PSSCH according to the assigned DCI format 3_0.

In some examples, the NW/gNB may provide the C-UE with the identity of each G-UE in its group. The amount of sensing and reporting by the C-UE may be reduced by providing the C-UE with the identity of each G-UE in its group.

In some example embodiments, the NW/gNB may identify Coordinating UEs, denoted as C-UEs, by their geographical locations. For example, the NW/gNB may determine overlapping cells containing multiple UEs wherein each cell may comprise one or more G-UEs and a UE of the one or more G-UEs may be determined as a C-UE. The network (NW)/gNB may set up groups of UEs, denoted as G-UEs, each associated with a C-UE. The NW/gNB may indicate a UE that it is a C-UE and may provide the identity of G-UEs in a group associated with a C-UE. The NW/gNB may provide the C-UE's groupcast parameters, including periodicity, to the C-UE. A G-UE may be assigned to one or more coordination groups by the NW/gNB. The identity of a C-UE in a group may be provided by the NW/gNB to the G-UE. The NW/gNB may send the C-UEs' groupcast parameters and periodicities to the G-UE.

The C-UE may detect and collect the transmission parameters of its G-UEs. Illustratively, the C-UE may sense one or more transmission parameters based on inspection of previous communications received from individual G-UEs. The C-UE may combine the transmission parameters of its G-UEs into a groupcast message. The C-UE may transmit the groupcast message at pre-established and/or periodic instances. Upon receiving and successfully decoding the groupcast message from the C-UE, the G-UE may check that its reported parameters were correctly transmitted. If not, the G-UE may transmit a NACK (negative acknowledgement). In some examples, no ACK (acknowledgement) may be sent to prevent unnecessary transmissions. If the message was received with a CRC failure, the G-UE may use the parameters contained in the last correctly received message. If CRC failure occurs in a preassigned number of consecutive messages from the C-UE, the G-UE may send a "lost C-UE" report to the NW. Using the received transmission parameters and its own channel sensing, the G-UE may transmit to a destination G-UE in time-frequency resources where there is not a collision or a half-duplex conflict.

In some examples, a G-UE may send its assigned periodic transmission parameters to the C-UE at the designated intervals. If the message from the G-UE is received erroneously, the C-UE may transmit a NACK, in which case an HARQ process may be initiated.

In some example embodiments, the NW/gNB may identify Coordinating UEs, denoted as C-UEs, by their geographical locations. For example, the NW/gNB may determine overlapping cells containing multiple UEs wherein each cell may comprise one or more G-UEs and a UE of the one or more G-UEs may be determined as a C-UE. The NW/gNB may set up groups of UEs, denoted as G-UEs, each associated with a C-UE. A G-UE may be assigned to one or more coordination groups by the NW/gNB. The NW/gNB may provide the identity of each C-UE to the G-UE. It also sends the C-UE's groupcast parameters, including periodicity, to the G-UE. The NW/gNB may assign transmission resources to be used to report to each of the assigned C-UEs. Additionally, the NW/gNB may assign a schedule or periodicity data to be used by the C-UEs to determine reporting criteria. These resources may be reserved until modified or disabled by the NW/gNB. The NW/gNB may send the G-UE ID and its assigned report transmission resources to a corresponding C-UE.

A G-UE may send its assigned periodic transmission parameters, e.g., time slot, frequency range, to the C-UE at the designated intervals. If the message is received erroneously, the C-UE may transmit a NACK, in which case a HARQ process may be initiated. The C-UE may collect the transmission parameters of each reported G-UE and may combine them into a groupcast message. In one embodiment, at pre-established, periodic instances, the C-UE may transmit the groupcast message. If the message from the C-UE was received with a CRC failure, the G-UE may use the parameters contained in the last correctly received message. If CRC failure occurs in a preassigned number of consecutive messages from the C-UE, the G-UE may send a "lost C-UE" report to the NW/gNB. Using the received transmission parameters and its own channel sensing, the G-UE may transmit to a destination G-UE in time-frequency resources where a collision or half-duplex conflict may not occur.

Figure 18:
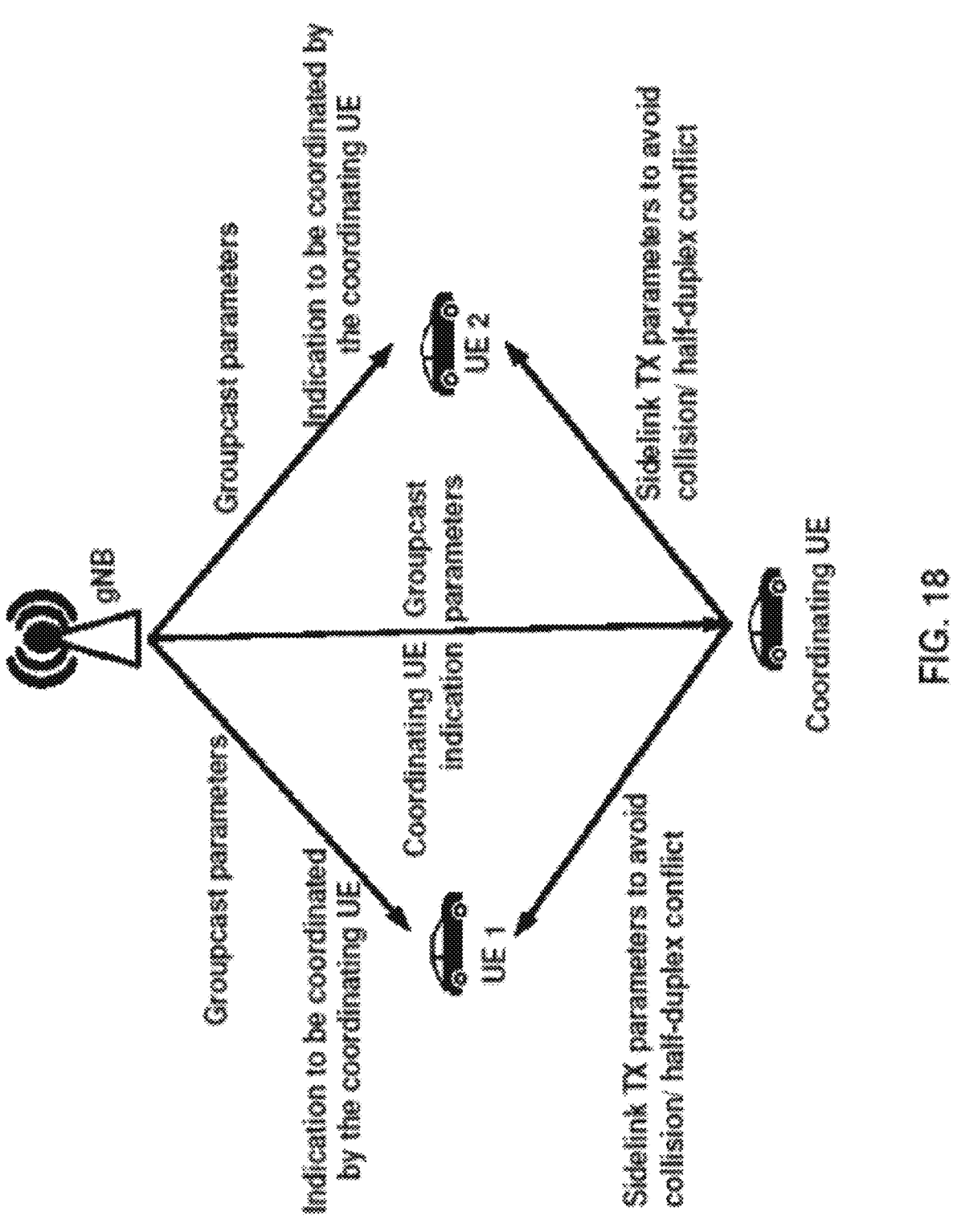
FIG. 18 shows example inter-UE coordination processes according to some aspects of one or more exemplary embodiments of the present disclosure.

In some example embodiments, as shown in FIG. 18, a base station (e.g., gNB) may serve a plurality of UEs (e.g., UE 1, UE 2, the coordinating UE) that communicate using sidelink communication channels. To minimize collisions or half-duplex conflicts among the sidelink communications of the UEs, the base station may group the plurality of UEs to one or more groups wherein a group comprises one or more UEs and the one or more UEs in the group are coordinated by a coordinating UE. For example, UE1 and UE2 in FIG. 18 may be coordinated by the coordinating UE. The base station may indicate to the coordinating UE its role as a coordinating UE. The base station may indicate to UE1 and UE2 that UE1 and UE2 are coordinated by the coordinating UE and the base station may indicate the identity of the coordinating UE to UE1 and UE2. The base station may indicate the identity of UE1 and UE2 to the coordinating UE. The base station may transmit groupcast transmission parameters to UE1 and UE2 and the coordinating UE. The coordinating UE may transmit a groupcast message based on the groupcast transmission parameters. The groupcast transmission parameters may comprise radio resources and time occasions of the groupcast message or the periodicity for transmission of groupcast messages. The groupcast transmission parameters may be used by the coordinating UE to transmit the assistance information using a groupcast message. The groupcast transmission parameters may be used by UE1 and UE2 to receive the assistance information via the groupcast message. The coordinating UE may indicate the sidelink transmission parameters to UE1 and UE2 to avoid collision or half-duplex conflict. The coordinating UE may determine the sidelink transmission parameters for UE1 and UE2 based on sensing and based on collecting transmission information of UE1 and UE2.

Figure 19:
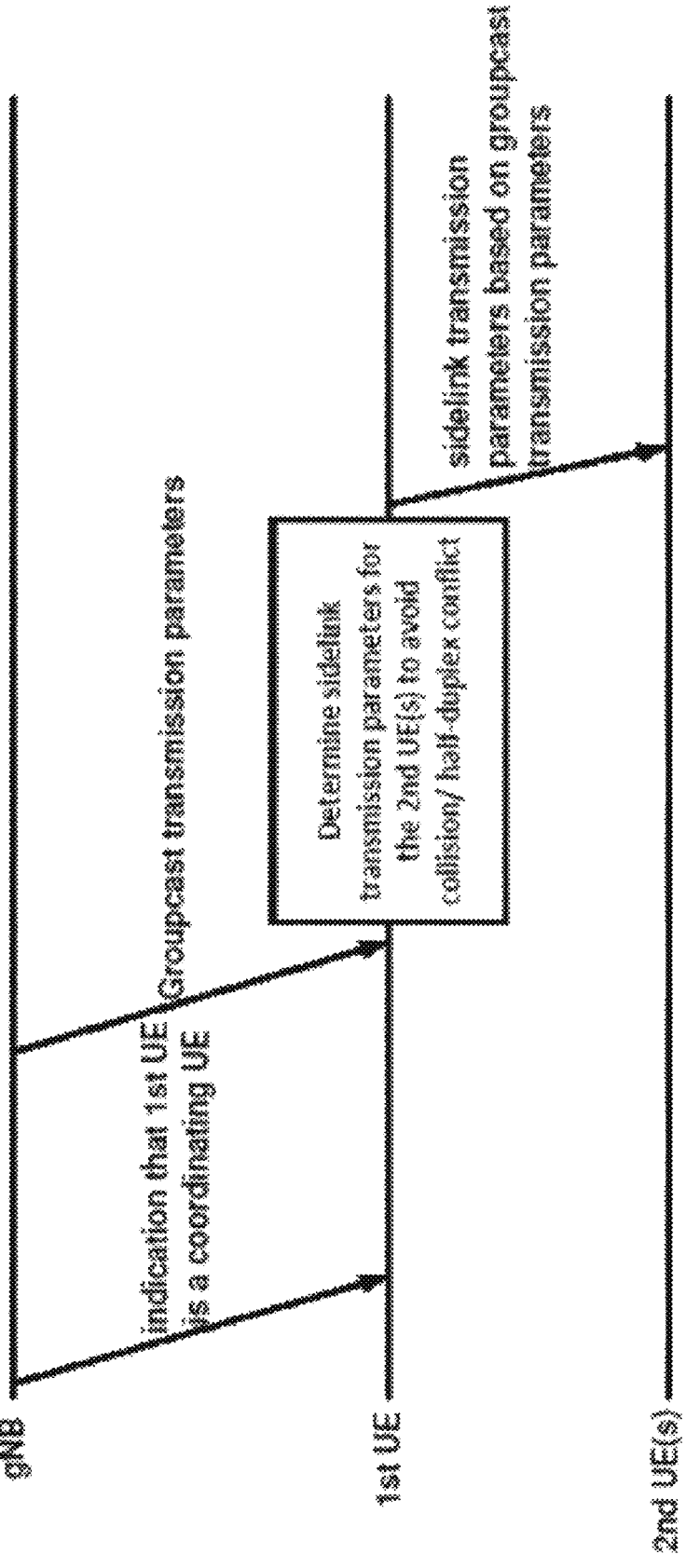
FIG. 19 shows example inter-UE coordination processes according to some aspects of one or more exemplary embodiments of the present disclosure.

In an example embodiment, as shown in FIG. 19, a first UE may receive an indication from a base station that the first UE is assigned a role as a coordinating UE. The role of a coordinating UE may be semi-statically (e.g., using RRC signaling) or dynamically (e.g., using physical layer or MAC signaling) be assigned to a UE. For example, in case of RRC signaling, the first UE may receive an RRC message comprising an information element, wherein the value of the information element may indicate that the first UE is a coordinating UE. For example, in case of physical layer signaling, the first UE may receive a DCI (e.g., a DCI with a format associated with sidelink communications). Illustratively, the DCI can include a field with a value that indicates that the first UE is a coordinating UE. The coordinating UE role for a UE may be assigned and revoked as needed and as determined by the base station. The base station may indicate that the first UE is a coordinating UE for one or more second UEs. In some examples, the base station may indicate identifiers of the one or more second UEs to the first UE.

The first UE may receive, from the base station, groupcast transmission parameters. In some examples, the groupcast transmission parameters may be specific to transmission of assistance information/coordination information for the one or more second UEs. In some examples, the groupcast transmission parameters may be shared for groupcasting the assistance information/coordination information and for other groupcasting purposes. The groupcast transmission parameters may comprise radio resources, modulation and coding scheme, power control parameters, etc. In some examples, the first UE may receive the groupcast transmission parameters using a downlink control information (e.g., DCI format 3_0 or other DCI formats). In other examples, the first UE may receive the groupcast transmission parameters via RRC signaling. For example, a first information element may indicate that the first UE is a coordinating UE, and a second information element may indicate the groupcast transmission parameters for the purpose of transmitting coordination information. Other signaling mechanisms (such as a MAC CE) may be used for transmission of groupcast transmission parameters. In some examples, the groupcast transmission parameters may be indicated using a broadcast message (e.g., a system information block (SIB)). In such a case, the groupcast transmission parameters may be known at the first UE and other UEs (including the one or more second UEs that are coordinated by the first UE).

The first UE may determine sidelink transmission parameters by the one or more second UEs to avoid collision or half-duplex conflict in sidelink transmissions of the one or more second UEs. In some examples, the determination of the sidelink transmission parameters of the one or more second UEs may consider attributes of the one or more second UEs based on the identifiers of the one or more second UEs. The first UE may determine the sidelink transmission parameters based on a request from a UE of the one or more second UEs or without a request from the one or more second UEs (e.g., passively, or actively, respectively). The first UE may determine the sidelink transmission parameters based on processing or sensing (detecting) previous transmissions received from the one or more second UEs, and collecting the relevant information. In other embodiments, the first UE may determine the sidelink transmission parameters, at least in part, based on predicting the transmission patterns of one or more second UEs. The first UE may utilize information about the one or more second UEs that may be provided to the first UE by the base station or by using other processes. The sidelink transmission parameters of the one or more second UEs may comprise radio resources (e.g., frequency resources and time domain parameters such as slot(s) or symbol(s) used for transmission), power level, transmission formats such as modulation and coding scheme, etc. The first UE may utilize an optimization process to minimize the collisions among the one or more second UEs or to completely avoid the collisions. In some examples, the first UE may consider a type of a UE in one or more second UEs or data scheduled for transmission by a UE in the one or more second UEs (for example, a priority of the data, a quality of service associated with the data, a type of data, etc.).

The first UE may transmit the determined sidelink transmission parameters to the one or more second UEs to be used by the one or more second UEs in their subsequent transmissions. The first UE may transmit the sidelink transmission parameters to the one or more second UEs based on a groupcast message. For example, the first UE may transmit the groupcast message(s) via a physical sidelink shared channel (PSSCH). The base station may indicate the groupcast parameters of the groupcast message (e.g., radio resources/timing of transmission of the groupcast message) to the first UE and to the one or more second UEs. In some examples, the groupcast message may be transmitted by the first UE to the one or more second UEs at a specific predetermined time or may be transmitted periodically, persistently, and/or semi-persistently. The base station may provide periodicity information or scheduling information utilized for transmission of groupcast messages. Additionally, the base station may provide other parameters associated with the transmission of the groupcast message. For example, the one or more second UEs may decode the groupcast message(s) using the parameters received from the base station.

In some examples, the first UE may receive feedback (e.g., ACK/NACK) from the one or more second UEs in response to transmission of the groupcast message. The first UE may receive the feedback information via one or more sidelink control channels (e.g., PSCCH). The first UE may consider the received feedback and may retransmit the groupcast message in response to receiving a NACK. The retransmission of the groupcast message may also be a groupcast message or may be one or more unicast messages. The feedback and retransmission of the groupcast message may be based on a HARQ process. In some examples, the first UE may receive a command (e.g., downlink control information, MAC CE, etc.) from the base station indicating retransmission of the groupcast message. For example, the base station may receive feedback from the one or more second UEs and may transmit the command for retransmission of the groupcast message to the first UE based on the feedback received from the one or more second UEs.

In some examples, the first UE may receive transmission parameters of scheduled sidelink transmission of the one or more second UEs (e.g., slots, frequency resources, periodicity, identifiers of the one or more second UEs, etc.) and the first UE may determine the sidelink transmission parameters for avoiding the collision or the half-duplex conflict based on the transmission parameters of the scheduled sidelink transmission of the one or more second UEs. The first UE may determine that some of the scheduled sidelink transmission parameters of the one or more second UEs need to change to avoid the collision/half-duplex conflict and may indicate the modified sidelink parameters to the first UE.

In some examples, the one or more second UEs may transmit scheduled sidelink transmission parameters to a defined schedule, periodicity interval or other scheduling or triggering criteria. In some examples, the one or more second UEs may be assigned radio resources for transmission of the scheduled sidelink transmission parameters to the first UE and the radio resources for reception of the scheduled sidelink transmission parameters may be indicated to the first UE by the base station. In some examples, a feedback mechanism (e.g., based on a HARQ process) may be used and the first UE may transmit negative acknowledgement (NACK) in response to erroneous reception of the scheduled sidelink transmission parameters.

Figure 20:
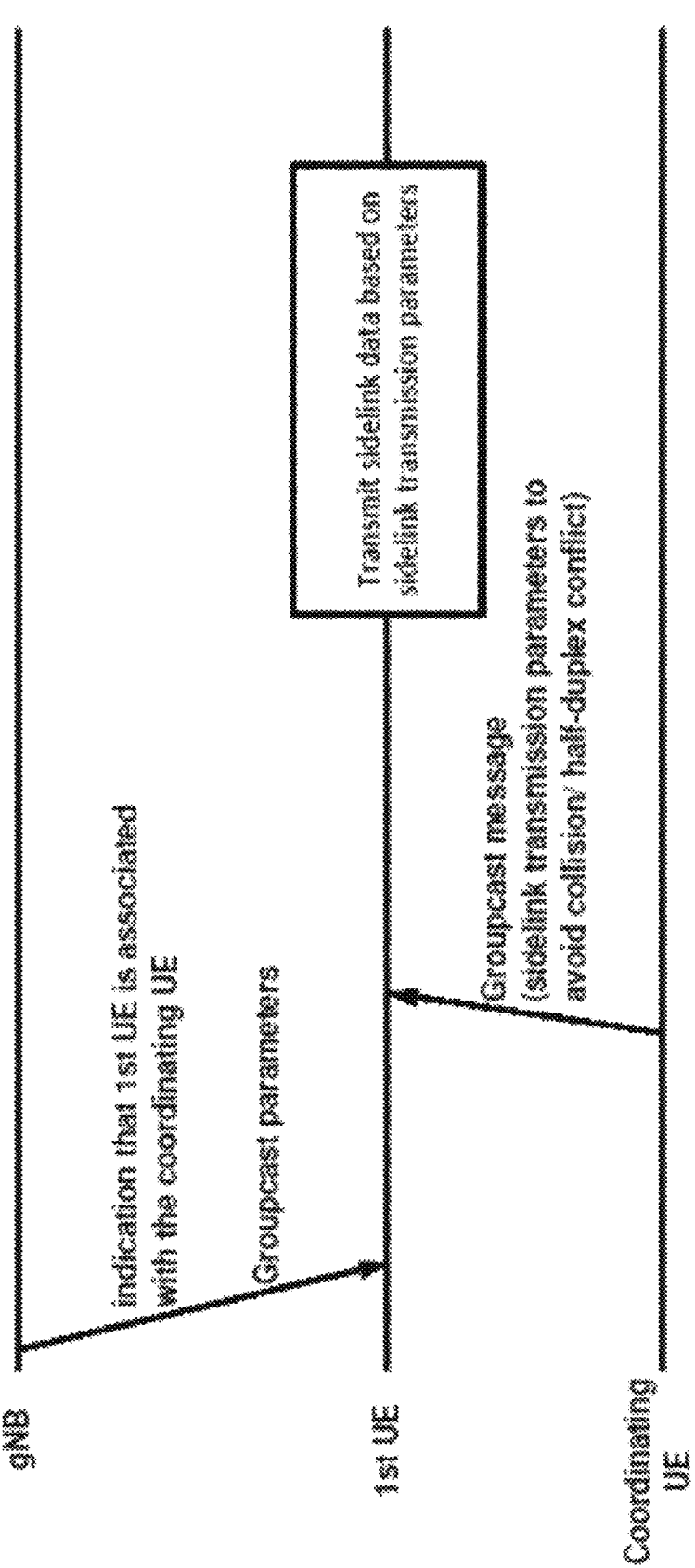
FIG. 20 shows example inter-UE coordination processes according to some aspects of one or more exemplary embodiments of the present disclosure.

In an example embodiment, as shown in FIG. 20, a first UE may receive an indication from a base station that the first UE is associated with one or more coordinating UEs. In some examples, the first UE may receive the indication from the base station in an RRC message. For example, one or more information elements in the RRC message may indicate identifiers of the one or more coordinating UEs. In some examples, the first UE may receive the indication from the base station based on physical layer or MAC layer signaling.

The first UE may receive groupcast transmission parameters associated with a first coordinating UE of the one or more coordinating UEs. In some examples, the groupcast transmission parameters may be specific to receiving assistance information/coordination information from the first coordinating UE. The groupcast transmission parameters may comprise radio resources, modulation and coding scheme, power control parameters, etc. In some examples, the groupcast transmission parameters may indicate the occasions for reception of the groupcast message. For example, the groupcast transmission parameters may indicate a periodicity in case the groupcast messages from the first coordinating UE are transmitted periodically. In some examples, the first UE may receive the groupcast transmission parameters using a downlink control information (e.g., DCI format 3_0 or other DCI formats). In some examples, the groupcast transmission parameters may be indicated to the first UE using RRC signaling. For example, a first information element may indicate that the first UE is associated with the one or more coordinating UEs and a second information element may indicate the groupcast transmission parameters for the purpose of receiving coordination information. Other signaling mechanisms (such as a MAC CE) may be used for reception of groupcast transmission parameters. In some examples, the groupcast transmission parameters may be indicated using a broadcast message (e.g., a system information block (SIB)). In such a case, the groupcast transmission parameters may be known by the first UE and the one or more coordinating UEs.

The first UE may receive a groupcast message indicating sidelink transmission parameters by the first UE to avoid collision or half-duplex conflict in its sidelink transmissions. In some examples, the first UE may transmit a request to the first coordinating UE indicating that it has packets for transmission and may receive the groupcast message from the first coordinating UE based on this request. In some examples, the first UE may receive the groupcast message without sending a request. The sidelink transmission parameters for the first UE may comprise radio resources (e.g., frequency resources and time domain parameters such as slot(s) or symbol(s) used for transmission), power level, transmission formats such as modulation and coding scheme, etc. In some examples, the first UE may receive the sidelink transmission parameters via a physical sidelink shared channel (PSSCH). In some examples, the groupcast message may be received by the first UE at a specific predetermined time or may be received periodically, persistently, and/or semi-persistently. The base station may indicate the periodicity or other parameters associated with the reception of the groupcast message and the first UE may decode the groupcast message(s) using the parameters received from the base station.

In some examples, the first UE may transmit feedback information (e.g., ACK/NACK) to the first coordinating UE indicating correct or erroneous reception of the groupcast message. The reception of the ACK/NACK by the first coordinating UE may initiate a HARQ process by the first coordinating UE and the first UE may receive a retransmission of the groupcast message (e.g., another groupcast message or a unicast message). In some examples, in response to incorrect reception of the groupcast message for a predetermined number of times, the first UE may indicate a failure message (e.g., an RRC message indicating failure) to the base station. The failure message may indicate that the first UE has lost its coordinating UE. The base station may reconfigure the first UE with a different coordinating UE or a different set of coordinating UEs based on receiving the failure message from the first UE.

In some examples, the first UE may indicate its scheduled sidelink transmission(s) parameters to the first coordinating UE. The scheduled sidelink transmission(s) parameters of the first UE may comprise slots, frequency resources or periodicity of the scheduled sidelink transmissions by the first UE. In some examples, the scheduled sidelink transmission(s) parameters may comprise an identifier of the first UE. The transmission of the scheduled sidelink transmission parameters by the first UE to the first coordinating UE may be based on radio resources indicated by the base station to the first UE. In some examples, the radio resources for transmission of the scheduled sidelink transmissions may be indicated to the first UE semi-statically (e.g., using RRC signaling) or dynamically.

The first coordinating UE may determine the content of the groupcast message (e.g., the assistance information) based on the scheduled sidelink transmission parameters by the first UE and other UEs. The first UE may transmit its scheduled sidelink transmission(s) parameters periodically or based on a periodicity.

The first UE may transmit to a second UE sidelink data using a sidelink physical channel (e.g., PSSCH) and based on the sidelink transmission parameters indicated to the first UE by the first coordinating UE.

In some embodiments, a first user equipment (UE) may receive from a base station, an indication that the first UE is a coordinating UE for coordination of sidelink transmissions of one or more second UEs. The first UE may receive, from the base station, one or more groupcast transmission parameters. The first UE may determine sidelink transmission parameters for the one or more second UEs and for avoiding collision or half-duplex conflict among the sidelink transmissions of one or more second UEs. The first UE may transmit to the one or more second UEs and based on the one or more groupcast transmission parameters, a groupcast message comprising the sidelink transmission parameters for the one or more second UEs.

In some examples, the transmitting the groupcast message may be at a predetermined time.

In some examples, the one or more groupcast transmission parameters may indicate one or more of transmission occasions and radio resources of groupcast messages. In some examples, the one or more groupcast transmission parameters may indicate a periodicity of the groupcast messages.

In some examples, the first UE may detect and collect transmission parameters of the one or more second UEs. In some examples, the determining the sidelink transmission parameters for the one or more second UEs may be based on the detected and collected transmission parameters.

In some examples, the receiving the indication may be based on receiving a radio resource control (RRC) message comprising a parameter indicating the indication.

In some examples, the receiving the indication may be based on receiving a downlink control information comprising a field, a value of the field indicating the indication.

In some examples, the receiving the one or more groupcast transmission parameters may be based on receiving an RRC message indicating the one or more groupcast transmission parameters.

In some examples, the receiving the one or more groupcast transmission parameters may be based on receiving a downlink control information indicating the one or more groupcast transmission parameters.

In some examples, transmitting the groupcast message may be via a physical sidelink shared channel (PSSCH) and based on receiving a downlink control information indicating the transmission parameters of the PSSCH.

In some examples, the first UE may receive identifiers of the one or more second UEs. In some examples, determining the sidelink transmission parameters may be based on the identifiers.

In some examples, the first UE may receive feedback information indicating an incorrect reception of the groupcast message by one or more UEs of the one or more second UEs. In some examples, the first UE may retransmit the groupcast message based on receiving the feedback information. In some examples, the feedback information may be a negative acknowledgement (NACK). In some examples, the receiving the feedback information may be via a sidelink control channel.

In some examples, the first UE may receive from the base station, a command indicating a retransmission of the groupcast message. In some examples, the command may be one of a downlink control information and a medium access control (MAC) control element.

In some examples, the first UE may receive from the one or more second UEs, transmission parameters of scheduled sidelink transmissions of the one or more second UEs. In some examples, the determining the sidelink transmission parameters for the one or more second UEs may be based on the scheduled sidelink transmissions of the one or more second UEs. In some examples, a timing for receiving the transmission parameters of the scheduled sidelink transmissions may be based on a periodicity. In some examples, the transmission parameters of the scheduled sidelink transmissions may comprise one or more of slots, frequency resources, and a periodicity. In some examples, the first UE may receive from the base station, a radio resource assignment for reception of the transmission parameters of the scheduled sidelink transmissions of the one or more second UEs. In some examples, the transmission parameters of the scheduled sidelink transmissions of the one or more second UEs may comprise identifiers of the one or more second UEs. In some examples, the first UE may transmit, one or more negative acknowledgements (NACKs) in response to receiving the transmission parameters of the scheduled sidelink transmissions of the one or more second UEs. In some examples, transmitting the one or more NACKs may be done to one or more UEs of the one or more second UEs, for which transmission parameters of the scheduled sidelink transmissions are received incorrectly.

In some embodiments, a first user equipment (UE) may receive from a base station, an indication that the first UE is associated with one or more coordinating UEs. The first UE may receive from the base station, groupcast transmission parameters of a first coordinating UE of the one or more coordinating UEs. The first UE may receive from the first coordinating UE and based on the groupcast transmission parameters, a groupcast message indicating sidelink transmission parameters for avoiding a collision or a half-duplex conflict for sidelink transmissions of the first UE. The first UE may transmit sidelink data to a second UE based on the sidelink transmission parameters.

In some examples, the first UE may receive from the base station, identifiers associated with the one or more coordinating UEs.

In some examples, the receiving the groupcast message may be at a predetermined time.

In some examples, the one or more groupcast transmission parameters may indicate one or more of transmission occasions and radio resources of groupcast messages. In some examples, the one or more groupcast transmission parameters indicate a periodicity of the groupcast messages.

In some examples, the first UE may transmit feedback information indicating incorrect reception of the groupcast message by the first UE.

In some examples, the feedback information may be negative acknowledgement (NACK) based feedback. In some examples, the first UE may transmit to the base station, a failure message indicating that the coordinating UE is lost.

In some examples, the first UE may transmit transmission parameters of scheduled sidelink transmissions of the first UE to the first coordinating UE. In some examples, a timing for transmitting the transmission parameters of the scheduled sidelink transmissions may be based on a periodicity.

In some examples, the transmission parameters of scheduled sidelink transmissions may comprise one or more slots, frequency resources, and a periodicity.

In some examples, the first UE may receive from the base station, a radio resource assignment for transmission of the transmission parameters of scheduled sidelink transmissions of the first UE.

In some examples, the transmission parameters of scheduled sidelink transmissions of the first UE may comprise an identifier of the first UE.

In some examples, the first UE may retransmit the transmission parameters of scheduled sidelink transmissions in response to receiving a negative acknowledgement (NACK).

The exemplary blocks and modules described in this disclosure with respect to the various example embodiments may be implemented or performed with a general-purpose processor, a DSP, an ASIC, a NACK, or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. An apparatus for utilization in wireless communications comprising:

an antenna for use in transmission of electromagnetic signals;

a memory for maintaining computer-readable code; and a processor for executing the computer-readable code that causes the apparatus to transmit an indication including at least one of information that the first UE has been assigned a coordinating UE for coordination of sidelink transmissions of a plurality of additional UEs or information identifying an assigned coordinating UE;

transmit one or more groupcast transmission parameters for transmitting sidelink transmission parameters to the plurality of additional UEs;

Clause 2. The apparatus of clause 1, wherein the one or more groupcast transmission parameters indicate one or more of transmission occasions and radio resources of groupcast messages.

Clause 3. The apparatus of clause 1, wherein the one or more groupcast transmission parameters include information identifying a schedule for transmission of the groupcast messages.

Clause 4. The apparatus of clause 1, wherein the apparatus transmitting the indication by the first UE includes receiving a radio resource control (RRC) message including information that the first UE has been assigned as a coordinating UE.

Clause 5. The apparatus of clause 1, wherein the apparatus transmitting the one or more groupcast transmission parameters is based on transmitting a radio resource control (RRC) message including information identifying the one or more groupcast transmission parameters.

Clause 6. The apparatus of clause 5, wherein the radio resource control (RRC) message includes the information that the first UE has been assigned as a coordinating UE in a first portion and information identifying the one or more groupcast transmission parameters in a second portion.

Clause 7. The apparatus of clause 1, wherein the apparatus transmitting the indication includes receiving a downlink control information a value of a field of the downlink control information including information that the first UE has been assigned as a coordinating UE.

Clause 8. The apparatus of clause 1, wherein the apparatus transmitting the one or more groupcast transmission parameters is based on receiving a downlink control information including information identifying the one or more groupcast transmission parameters.

Clause 9. The apparatus of clause 1, wherein the apparatus is further configured to transmit information identifying of the one or more second UEs.

Clause 10. The apparatus of clause 1, wherein the apparatus is further configured to determine a coordinating UE based on geographic location.

Clause 11. The apparatus of clause 1, wherein the apparatus is further configured to revoke at least reserved transmission resource.

Clause 12. A method for mobile communications including sidelink transmissions, comprising:

transmitting, by a base station, an indication including at least one of information that the first UE has been assigned a coordinating UE for coordination of sidelink transmissions of a plurality of additional UEs or information identifying an assigned coordinating UE;

transmitting, by the base station, one or more groupcast transmission parameters for transmitting sidelink transmission parameters to the plurality of additional UEs;

Clause 13. The method of clause 12, wherein the one or more groupcast transmission parameters indicate one or more of transmission occasions and radio resources of groupcast messages.

Clause 14. The method of clause 12, wherein the one or more groupcast transmission parameters include information identifying a schedule for transmission of the groupcast messages.

Clause 15. The method of Clause 12, wherein transmitting the indication by the first UE includes receiving a radio resource control (RRC) message including information that the first UE has been assigned as a coordinating UE.

Clause 16. The method of clause 15, wherein transmitting the one or more groupcast transmission parameters is based on transmitting a radio resource control (RRC) message including information identifying the one or more groupcast transmission parameters.

Clause 17. The method of clause 16, wherein the radio resource control (RRC) message includes the information that the first UE has been assigned as a coordinating UE in a first portion and information identifying the one or more groupcast transmission parameters in a second portion.

Clause 18. The method of clause 12, wherein transmitting the indication includes receiving a downlink control information a value of a field of the downlink control information including information that the first UE has been assigned as a coordinating UE.

Clause 19. The method of clause 12, transmitting the one or more groupcast transmission parameters is based on receiving a downlink control information including information identifying the one or more groupcast transmission parameters.

Clause 20. The method of clause 12, further comprising transmitting information identifying of the one or more second UEs.

Clause 21. The method of clause 12, further comprising determining a coordinating UE based on geographic location.

Clause 22. The method of clause 12, further comprising revoking at least reserved transmission resource.

Clause 23. An apparatus for utilization in wireless communications comprising:

an antenna for use in transmission of electromagnetic signals;

a memory for maintaining computer-readable code; and a processor for executing the computer-readable code that causes the apparatus to:

receive an indication that the first UE is a coordinating UE for coordination of sidelink transmissions of one or more second UEs;

receive one or more groupcast transmission parameters;

determine sidelink transmission parameters associated with the one or more second UEs, wherein the first UE utilizes the determining the sidelink transmission parameters to avoid collision or half-duplex conflict among the sidelink transmissions of the one or more second UEs; and transmit a groupcast message to the one or more second UEs, wherein the groupcast comprising the sidelink transmission parameters for the one or more second UEs and wherein transmission of the groupcast message is based on the received groupcast transmission parameters.

Clause 24. The apparatus of clause 23, wherein the apparatus transmits the groupcast message at a predetermined time.

Clause 25. The apparatus of clause 23, wherein the one or more groupcast transmission parameters include information identify a schedule for transmission of the groupcast messages.

Clause 26. The apparatus of clause 23, wherein the apparatus is further configured to identify at least a portion of the transmission parameters of the one or more second user equipments (UEs) based on at least one previously received transmission from the one or more second UEs.

Clause 27. The apparatus of clause 23, wherein the apparatus receives the indication by the first UE based on at least one of receiving a radio resource control (RRC) message including information that the first UE has been assigned as a coordinating UE or receiving a downlink control information a value of a field of the downlink control information including information that the first UE has been assigned as a coordinating UE.

Clause 28. The apparatus of clause 23, wherein the apparatus receives the one or more groupcast transmission parameters based on at least one of receiving a radio resource control (RRC) message including information identifying the one or more groupcast transmission parameters or receiving a downlink control information including information identifying the one or more groupcast transmission parameters.

Clause 29. The apparatus of clause 23, wherein apparatus transmits the groupcast message via a physical sidelink shared channel (PSSCH) and based on receiving a downlink control information comprising the PSSCH transmission parameters.

Clause 30. The apparatus of clause 23, wherein the apparatus determines the sidelink transmission parameters includes determining the sidelink transmission parameters based on the information identifying the one or more second UEs.

Clause 31. The apparatus of clause 23, wherein the sidelink transmission parameters comprise a set of resources preferred for the one or more second UEs or a set of resources not preferred for the one or more second UEs.

Clause 32. The apparatus of clause 23, wherein the processor is configured to execute the instructions to determine the sidelink transmission parameters based on at least one of:

a result of sensing transmission parameters of the one or more second UEs; and a predicted resource collision or a predicted half-duplex conflict in the sidelink transmissions.

Clause 33. The apparatus of clause 23, wherein the processor is configured to execute the instructions to determine the sidelink transmission parameters based on a detected resource collision or a detected half-duplex conflict in the sidelink transmissions.

Clause 34. A method for mobile communications including sidelink transmissions, comprising:

receiving, by a first user equipment (UE), an indication that the first UE is a coordinating UE for coordination of sidelink transmissions of one or more second UEs;

receiving, by the first UE, one or more groupcast transmission parameters;

determining, by the first UE, sidelink transmission parameters associated with the one or more second UEs, wherein the first UE utilizes the determinations of the sidelink transmission parameters to avoid collision or half-duplex conflict among the sidelink transmissions of the one or more second UEs; and transmitting, by the first UE, a groupcast message to the one or more second UEs, wherein the groupcast transmission parameters comprising the sidelink transmission parameters for the one or more second UEs and wherein transmission of the groupcast message is based on the received groupcast transmission parameters.

Clause 35. The method of clause 34, wherein transmitting the groupcast message includes transmitting the groupcast message at a predetermined time.

Clause 36. The method of clause 34, wherein the one or more groupcast transmission parameters indicate one or more of transmission occasions and radio resources of groupcast messages.

Clause 37. The method of clause 36, wherein the one or more groupcast transmission parameters include information identifying a schedule for transmission of the groupcast messages.

Clause 38. The method of clause 34 further comprising identifying at least a portion of the transmission parameters of the one or more second user equipments (UEs) based on at least one previously received transmission from the one or more second UEs.

Clause 39. The method of clause 38, wherein determining the sidelink transmission parameters includes identifying the sidelink transmission parameters based on the identified at least a portion of the transmission parameters.

Clause 40. The method of clause 34, wherein receiving the indication by the first UE includes receiving a radio resource control (RRC) message including information that the first UE has been assigned as a coordinating UE.

Clause 41. The method of clause 34, wherein receiving the indication includes receiving a downlink control information, a value of a field of the downlink control information including information that the first UE has been assigned as a coordinating UE.

Clause 42. The method of clause 34, wherein receiving the one or more groupcast transmission parameters is based on receiving a radio resource control (RRC) message including information identifying the one or more groupcast transmission parameters.

Clause 42. The method of clause 34, wherein receiving the one or more groupcast transmission parameters by the first UE is based on receiving a downlink control information including information identifying the one or more groupcast transmission parameters.

Clause 43. The method of clause 34 wherein transmitting the one or more groupcast transmission parameters to the one or more second UEs includes transmitting the groupcast message via a physical sidelink shared channel (PSSCH), based on receiving a downlink control information comprising PSSCH transmission parameters.

Clause 44. The method of clause 34 further comprising receiving, by the first UE, information identifying of the one or more second UEs.

Clause 45. The method of clause 44, wherein determining the sidelink transmission parameters includes determining the sidelink transmission parameters based on the information identifying the one or more second UEs.

Clause 46. The method of clause 34 further comprising receiving, by the first UE, feedback information corresponding to incorrect reception of the groupcast message by at least one of the one or more second UEs.

Clause 47. The method of clause 46 further comprising retransmitting, by the first UE, the groupcast message responsive to reception of the feedback information.

Clause 48. The method of clause 46, wherein the feedback information corresponds to a negative acknowledgement (NACK).

Clause 49. The method of clause 46, wherein receiving the feedback information includes receiving the feedback information via a physical sidelink control channel (PSCCH).

Clause 50. The method of clause 34 further comprising receiving, by the first UE, a command directing retransmission of the groupcast message.

Clause 51. The method of clause 50, wherein the command directing retransmission is corresponds to at least one of a downlink control information and a medium access control (MAC) control element (MAC CE).

Clause 52. The method of clause 34 further comprising receiving from the one or more second UEs transmission parameters of scheduled sidelink transmissions associated with the one or more second UEs.

Clause 53. The method of clause 52, wherein determining, by the first UE, the sidelink transmission parameters for the one or more second user equipments (UEs) is based at least in part on the received transmission parameters of the scheduled sidelink transmissions.

Clause 54. The method of clause 52, wherein receiving the transmission parameters of the scheduled sidelink transmissions includes receiving the transmission parameters based on a periodicity.

Clause 55. The method of 52, wherein the transmission parameters of the scheduled sidelink transmissions comprise one or more of slots, frequency resources, and a periodicity.

Clause 56. The method of clause 52 further comprising receiving, by the first UE from the base station, radio resource assignment for reception of the transmission parameters of the scheduled sidelink transmissions of the one or more second UEs.

Clause 57. The method of clause 52, wherein the transmission parameters of the scheduled sidelink transmissions of the one or more second UEs include respective identifiers associated with the one or more second UEs.

Clause 58. The method of clause 52 further comprising transmitting to the one or more second UEs one or more negative acknowledgements (NACKs) in response to an erroneous reception of messages comprising the transmission parameters of scheduled sidelink transmissions of the one or more second UEs.

Clause 59. The method of clause 58, wherein transmitting of the one or more negative acknowledgements is done to one or more third user equipments (UEs), of the one or more second UEs, for which transmission parameters of the scheduled sidelink transmissions are received incorrectly.

Clause 60. A method comprising:

receiving, by a first user equipment (UE), an indication that the first UE is associated with one or more coordinating UEs;

receiving, by the first UE, groupcast transmission parameters of a first coordinating UE of the one or more coordinating UEs;

receiving, by the first UE, a groupcast message including sidelink transmission parameters, the sidelink transmission parameters configured to avoid a collision or a half-duplex conflict for sidelink transmissions of the first UE; and transmitting, by the first UE to a second UE, sidelink data based on the sidelink transmission parameters received from the first coordinating UE.

Clause 61. The method of clause 60 further comprising receiving, by the first UE, identifiers associated with the one or more coordinating UEs.

Clause 62. The method of clause 60, wherein receiving the groupcast message includes receiving the groupcast message at a predetermined time.

Clause 63. The method of clause 60, wherein one or more groupcast transmission parameters include information identifying one or more of transmission occasions and radio resources of groupcast messages.

Clause 64. The method of clause 63, wherein the one or more groupcast transmission parameters indicate a periodicity of the groupcast messages.

Clause 65. The method of 60 further comprising transmitting feedback information indicating incorrect reception of the groupcast message by the first UE.

Clause 66. The method of clause 65, wherein the feedback information indicates a negative acknowledgement.

Clause 67. The method of clause 66 further comprising transmitting to the base station a failure message in response to exceeding a predetermined number of consecutive failures.

Clause 68. The method of clause 60, further comprising a step of transmitting, by the first UE to the first coordinating UE, transmission parameters of scheduled sidelink transmissions of the first UE.

Clause 70. The method of clause 68, wherein transmitting the transmission parameters of the scheduled sidelink transmissions includes transmitting the transmission parameters based on a periodicity.

Clause 71. The method of clause 68, wherein the transmission parameters of the scheduled sidelink transmissions comprise one or more of slots, frequency resources, and a periodicity.

Clause 72. The method of clause 68, further comprising receiving from the base station, radio resource assignment for transmission of the transmission parameters of the scheduled sidelink transmissions of the first UE.

Clause 73. The method of clause 68, the wherein transmission parameters of the scheduled sidelink transmissions of the first UE comprise an identifier of the first UE.

Clause 74. The method of clause 68, further comprising a step of retransmitting, by the first UE, the transmission parameters of the scheduled sidelink transmissions in response to receiving a negative acknowledgement (NACK).

Clause 75. An apparatus for utilization in wireless communications comprising:

an antenna for use in transmission of electromagnetic signals;

a memory for maintaining computer-readable code; and a processor for executing the computer-readable code that causes the apparatus to receive an indication that the first UE is associated with one or more coordinating UEs;

receive groupcast transmission parameters of a first coordinating UE among the one or more coordinating UEs;

receive a groupcast message including sidelink transmission parameters, the sidelink transmission parameters configured to avoid a collision or a half-duplex conflict for sidelink transmissions of the first UE; and transmit sidelink data based on the sidelink transmission parameters received from the first coordinating UE.

Clause 76. The apparatus of clause 75, wherein the apparatus is further configured to receive identifiers associated with the one or more coordinating UEs.

Clause 77. The apparatus of clause 75, wherein the apparatus receives the groupcast message at a predetermined time.

Clause 78. The apparatus of clause 75, wherein the one or more groupcast transmission parameters include information identifying one or more of transmission occasions and radio resources of groupcast messages.

Clause 79. The apparatus of clause 78, wherein the one or more groupcast transmission parameters indicate a periodicity of the groupcast messages.

Clause 80. The apparatus of 75, wherein the apparatus is further configured to transmit feedback information indicating incorrect reception of the groupcast message by the first UE.

The invention claimed is:

1. An apparatus for utilization in wireless communications, comprising:

an antenna for use in transmission of electromagnetic signals;

a memory for maintaining computer-readable code; and a processor configured to execute the computer-readable code to cause the apparatus to:

receive one or more groupcast transmission parameters;

determine sidelink transmission parameters associated with one or more UEs, wherein the determined sidelink transmission parameters are to be used to avoid collision or half-duplex conflict in sidelink transmissions of the one or more UEs; and transmit a groupcast message to the one or more UEs, wherein the groupcast message comprises the sidelink transmission parameters for the one or more UEs, and wherein transmission of the groupcast message is based on the received one or more groupcast transmission parameters, wherein the sidelink transmission parameters include assistance information indicating a set of resources used by a certain UE and enabling the one or more UEs to select a set of resources to be used by the one or more UEs, and wherein the sidelink transmission parameters comprise a set of resources preferred for the one or more UEs or a set of resources not preferred for the one or more UEs.

2. The apparatus according to claim 1, wherein the processor is configured to execute the computer-readable code to cause the apparatus to transmit the groupcast message at a predetermined time.

3. The apparatus according to claim 1, wherein the one or more groupcast transmission parameters include information to identify a schedule for transmission of the groupcast message.

4. The apparatus according to claim 1, wherein the processor is configured to execute the computer-readable code to cause the apparatus to identify at least a portion of the sidelink transmission parameters of the one or more UEs based on at least one previously received transmission from the one or more UEs.

5. The apparatus according to claim 1, wherein the processor is configured to execute the computer-readable code to cause the apparatus to receive an indication indicating that the apparatus is a coordinating UE for coordination of the sidelink transmissions of the one or more UEs, based on at least one of: receiving a radio resource control (RRC) message including information that the apparatus has been assigned as the coordinating UE, or receiving a downlink control information, a value of a field of the downlink control information including information indicating that the apparatus has been assigned as the coordinating UE.

6. The apparatus according to claim 1, wherein the processor is configured to execute the computer-readable code to cause the apparatus to determine the sidelink transmission parameters based on at least one of:

a result of sensing the sidelink transmission parameters of the one or more UEs; or a predicted resource collision or a predicted half-duplex conflict in the sidelink transmissions.

7. The apparatus according to claim 1, wherein the processor is configured to execute the computer-readable code to cause the apparatus to determine the sidelink transmission parameters based on a detected resource collision or a detected half-duplex conflict in the sidelink transmissions.

8. A method for mobile communications including sidelink transmissions, the method comprising:

receiving, by a first user equipment (UE), one or more groupcast transmission parameters;

determining, by the first UE, sidelink transmission parameters associated with one or more second UEs, wherein the determined sidelink transmission parameters are to be used to avoid collision or half-duplex conflict among sidelink transmissions of the one or more second UEs; and transmitting, by the first UE, a groupcast message to the one or more second UEs, wherein the groupcast message comprises the sidelink transmission parameters for the one or more second UEs, and wherein transmission of the groupcast message is based on the received groupcast transmission parameters, wherein the sidelink transmission parameters include assistance information indicating a set of resources used by a certain UE and enabling the one or more second UEs to select a set of resources to be used by the one or more second UEs, and wherein the sidelink transmission parameters comprise a set of resources preferred for the one or more second UEs or a set of resources not preferred for the one or more second UEs.

\* \* \* \* \*